(12) United States Patent
Funamoto et al.

(10) Patent No.: US 8,547,885 B2
(45) Date of Patent: Oct. 1, 2013

(54) APPARATUS AND METHOD FOR SELECTION OF COMMUNICATION METHOD FOR COMMUNICATING WITH AN EXTERNAL APPARATUS

(76) Inventors: Kazuhisa Funamoto, Kanagawa (JP); Kazuhiro Oguchi, Tokyo (JP); Kazukuni Takanohashi, Saitama (JP)

( * ) Notice: Subject to any disclaimer, the term of this patent is extended or adjusted under 35 U.S.C. 154(b) by 315 days.

(21) Appl. No.: 12/947,174

(22) Filed: Nov. 16, 2010

(65) Prior Publication Data

US 2011/0142040 A1   Jun. 16, 2011

(30) Foreign Application Priority Data

Dec. 16, 2009   (JP) ................... 2009-285036

(51) Int. Cl.
*H04B 7/00*    (2006.01)
*H04L 29/06*   (2006.01)
(52) U.S. Cl.
CPC .................................... *H04L 29/06* (2013.01)
USPC ........................... 370/310; 370/389; 370/392
(58) Field of Classification Search
None
See application file for complete search history.

(56) References Cited

U.S. PATENT DOCUMENTS 5,362,954 A * 11/1994 Komatsu ..................... 235/492
2003/0014579 A1* 1/2003 Heigl et al. .................. 710/105
2006/0038024 A1* 2/2006 Nakadai et al. ............. 235/492
2008/0088366 A1* 4/2008 Nakadai et al. ............. 329/306
2009/0132898 A1* 5/2009 Nakamura et al. .......... 714/799
2009/0160625 A1* 6/2009 Miyagawa ................ 340/10.51
2009/0322484 A1* 12/2009 Toriyama et al. .......... 340/10.1
2010/0279733 A1* 11/2010 Karsten et al. ............ 455/552.1

FOREIGN PATENT DOCUMENTS

JP      2003-233787          8/2003
JP      2003249870 A    *   9/2003
JP      2006-60363           3/2006

* cited by examiner

*Primary Examiner* — Ayaz Sheikh
*Assistant Examiner* — Peter Chau
(74) *Attorney, Agent, or Firm* — Sony Corporation

(57) ABSTRACT

Disclosed herein is a signal processing apparatus including a plurality of frame head detection sections configured to determine whether a frame head complying with any one of a plurality of different communication methods is detected by comparing the waveform of a signal sent from an external apparatus with a plurality of predetermined different symbol patterns; a communication method selection section configured to select the communication method for communicating with the external apparatus based on results of the determination by the frame head detection sections and on the priority of each of the plurality of communication methods; and a priority changing section configured such that if a second communication method different from an initially selected first communication method is selected anew, then the priority changing section changes the priority of each of the plurality of communication methods based on the newly selected second communication method.

8 Claims, 18 Drawing Sheets

FIG. 1

| | DATA VALUE "1" | DATA VALUE "0" | VALUES BINARIZED AT THRESHOLD AT INTERVALS OF 1/4 ETU |
|---|---|---|---|
| Type A | (SEQUENCE X) | (SEQUENCE Y) (SEQUENCE Z) | SEQUENCE X: [1,1,0,1]<br>SEQUENCE Y: [1,1,1,1]<br>SEQUENCE Z: [0,1,1,1] |
| Type B | | | LOGICAL "1": [1,1,1,1]<br>LOGICAL "0": [0,0,0,0] |
| Felica | | | LOGICAL "1": [1,1,0,0]<br>LOGICAL "0": [0,0,1,1] |

FIG. 2

| | START OF COMMUNICATION (FRAME HEAD) | END OF COMMUNICATION (End of Frame) |
|---|---|---|
| Type A | (SEQUENCE Z) | NONMODULATION FOLLOWING DATA VALUE "0" (SEQUENCE Z + SEQUENCE Y) |
| Type B | SOF | DATA VALUE "1" + EOF |
| Felica | Preamble + sync | NONMODULATION (AMPLITUDE UNCHANGED) |

FIG.11

| | | d125 (Felica 212kbps) | d124 (Felica 424kbps) | d123 (Type B) | d122 (Type A) |
|---|---|---|---|---|---|
| VALUE OF d119 | INITIAL VALUE | 4 | 3 | 2 | 1 |
| | Type A | 4 | 3 | 2 | 1 |
| | Type B | 3 | 2 | 1 | 0 |
| | Felica 424kbps | 2 | 1 | 0 | 0 |
| | Felica 212kbps | 1 | 0 | 0 | 0 |

FIG.12

| VALUE OF d119 BEFORE UPDATE | | d105=H | d105=L | | | |
|---|---|---|---|---|---|---|
| | | | d106=H | d106=L | | |
| | | | | d104=H | d104=L | |
| | | | | | | d103=H |
| | INITIAL VALUE | F212 | F424 | B | A | |
| | Type A | F212 | F424 | B | A | |
| | Type B | F212 | F424 | B | | |
| | Felica 424kbps | F212 | F424 | | | |
| | Felica 212kbps | F212 | | | | |

FIG.14

| VALUE OF d119 | | d125 (Felica 212kbps) | d124 (Felica 424kbps) | d123 (Type B) | d122 (Type A) |
|---|---|---|---|---|---|
| | INITIAL VALUE | 3 | 2 | 1 | 4 |
| | Type A | 0 | 0 | 0 | 1 |
| | Type B | 3 | 2 | 1 | 4 |
| | Felica 424kbps | 2 | 1 | 0 | 3 |
| | Felica 212kbps | 1 | 0 | 0 | 2 |

FIG. 15

| VALUE OF d119 BEFORE UPDATE | INITIAL VALUE | d403=H | d403=L | | |
|---|---|---|---|---|---|
| | | | d405=H | d404=H | d404=L |
| | | | | | d403=H |
| Type A | | A | F212 | F424 | B |
| Type B | | A | F212 | F424 | |
| Felica 424kbps | | A | F212 | F424 | B |
| Felica 212kbps | | A | F212 | | |

FIG.18

| VALUE OF d419 | d425 | d424 | d423 | d422 |
|---|---|---|---|---|
| INITIAL VALUE | 4 | 3 | 2 | 1 |
| Type A | 4 | 3 | 2 | 1 |
| Type B | 3→0 | 2→0 | 1 | 0 |
| Felica 424kbps | 2 | 1 | 0 | 0 |
| Felica 212kbps | 1 | 0 | 0 | 0 |

APPARATUS AND METHOD FOR SELECTION OF COMMUNICATION METHOD FOR COMMUNICATING WITH AN EXTERNAL APPARATUS

BACKGROUND OF THE INVENTION

1. Field of the Invention

The present invention relates to a signal processing apparatus and a signal processing method. More particularly, the invention relates to a signal processing apparatus and a signal processing method for ensuring reliable communication with each of different communicating parties adopting communication methods in such a manner that the time it takes to establish communication with the communicating party of interest is appreciably shortened.

2. Description of the Related Art

Recent years have witnessed the widespread acceptance of traffic control systems, security systems, electronic money systems and others that utilize the noncontact IC card. A typical system using such a noncontact IC card works as follows: when the noncontact IC card comes into the communicable distance of a reader/writer of the system, the reader/writer emits electromagnetic waves to the card via an antenna. In this state, the reader/writer transmits a signal requesting a return of data from the noncontact IC card via the antenna. In response, the noncontact IC card load-modulates the requested data into return data and sends that data to the reader/writer via its antenna section.

The reader/writer receives the load-modulated signal from the noncontact IC card and demodulates the received signal to acquire the return data. This kind of demodulation processing is generally implemented by the demodulation section incorporated in the reader/writer.

The demodulation section is typically structured as a circuit placed in the IC chip. The demodulation section may be incorporated in the reader/writer as mentioned above to demodulate the signal sent from the noncontact IC card. Alternatively, the demodulation section may be included in the noncontact IC card to demodulate the signal coming from the reader/writer.

In the description that follows, the operation mode in which to receive the signal from the reader/writer will be called card mode, and the operation mode in which to receive the signal from the noncontact IC card will be referred to as reader/writer mode. What follows is a description of the demodulation section that operates primarily in card mode.

In this specification, the unit data period representative of one-bit data in the modulated signal will be called an ETU (Elementary Time Unit). It is assumed that the data value of each bit is demodulated according to the bit coding method defined for each communication method in use.

Today, the formats of signals transmitted from the reader/writer to the noncontact IC card or vice versa are defined by standards such as ISO 14443 and ISO 18092. There are three types of signal formats defined by these standards: Type A (ISO 14443-A), Type B (ISO 14443-B), and Type C (also called FeliCa type).

Illustratively, the Type A noncontact IC card generates a return signal by load-modulating a 13.56 MHz carrier using an 847 KHz subcarrier (847.5 KHz, to be more precise) in response to return data to the reader/writer. Specifically, with the Type A format, a data value "1" is expressed when the subcarrier is superposed typically on the first half of one ETU representing one-bit data; a data value "0" is expressed when the subcarrier is superposed on the second half of one ETU.

With the Type A format, the 100% ASK modulation method is adopted per data period. The data to be transmitted is bit-coded using modified Miller coding.

For the Type B format, the 10% ASK modulation method is adopted. This method involves using a carrier signal with its amplitude indicative of a value "1" per ETU and a carrier signal having a 90% amplitude indicative of a value "0."

The FeliCa format adopts the BPSK modulation method with modulation ratios ranging from 8% to 30% as well as the Manchester coding method. With the FeliCa format, transitions are effected from Low to High levels or vice versa to express a data value "1" or "0" per ETU.

Illustratively, the demodulation section binarizes bit-coded waveforms at a threshold value at intervals of ¼ ETU, thereby identifying a binarized signal sequence with 4 bits per ETU. This process demodulates the data transmitted from the reader/writer.

For example, the threshold value is set to an amplitude ratio of 50% for the Type A format, 95% for the Type B format, and 15% for FeliCa®. The interval in which the waveform is higher than the threshold value is binarized to a value "1" and the interval where the waveform is lower than the threshold value is binarized to a value "0."

Each of the above-mentioned three formats differently defines information representing a start of communication (frame head) and information denoting an end of communication.

Illustratively, for the Type A format, a predetermined binarized signal sequence coming in as a received signal in a first ETU is interpreted as information representing a start of communication. For the Type A format, a binarized signal sequence coming in with a non-modulation interval following a data value "0" is regarded as information denoting an end of communication.

Illustratively for the Type B format, a binarized signal sequence of SOF (10-bit value "0" and 2-bit value "1") is defined as a frame head. Also for the Type B format, a binary signal sequence with a data value "1" and a data value "0" for 10 ETU's is defined as information denoting an end of communication.

Illustratively for the FeliCa format, a binarized signal sequence called "Preamble+Sync" appearing at a start of communication is defined as a frame head. "Preamble" is a binarized signal sequence made up of zeros of at least 48 bits, and "Sync" is a binarized signal sequence corresponding to 16 bits representing "B24D" in hexadecimal notation. Also for the FeliCa format, the arrival of a non-modulation interval (amplitude unmodulated in both the first-half (½) ETU and the second-half (½) ETU) is defined as the information denoting an end of communication.

Furthermore, according to ISO 14443 and ISO 18092, there are four bit rates (106 kbps, 212 kbps, 424 kbps, 847 kbps) corresponding to the Type A and Type B formats. There are two bit rates (212 kbps, 424 kbps) corresponding to the FeliCa format.

From now on, the types and communication rates of noncontact IC cards are expected to grow. Under these circumstances, techniques have been proposed to implement a noncontact IC card capable of communicating with reader/writers operating on different communication methods (e.g., see Japanese Patent No. 2003-233787, called the Patent Document 1 hereunder; and Japanese Patent No. 2006-60363, referred to as the Patent Document 2 hereunder).

That is, the proposals present methods and system apparatuses for establishing noncontact communication between the noncontact IC card and the reader/writer each capable of switching between a plurality of communication interfaces, in such a manner that a search is made from one communication method to another until the communication is established.

Illustratively, according to the technique disclosed in the Patent Document 1 cited above, when the inventive setup is to establish the communication method in effect between the noncontact IC card and the reader/writer, a distinction is made between an externally received modulated signal and noise on the basis of the recurrence of the signal. The modulation method is changed successively in the upstream part of the setup for consistency with the coding method that is changed consecutively in the downstream part of the setup. In this manner, a search is made for the communication method compatible with the signal coming from the noncontact IC card or from the reader/writer until communication is established between the two.

One disadvantage of the technique disclosed in the Patent Document 1 is that it takes time to complete the search for the correct communication method. That is because the search is made while the communication method is being changed one after another.

For example, a demodulation selector is disposed on the input side of a plurality of demodulation circuits. The demodulation selector selects one demodulation circuit after another to determine if the selected circuit can demodulate the received signal. If the selected demodulation circuit is found incapable of demodulating the signal, the next demodulation circuit is selected and the determination is again attempted.

If the determination above reveals that the selected demodulation circuit can demodulate the signal, then a coding selector disposed on the output side of the multiple demodulation circuits selects each of a plurality of decoding circuits to determine if the selected decoding circuit can decode the input data. That means the compatible communication method may not be identified during the reception of the first frame. It takes time before the connection is established between the noncontact IC card and the reader/writer and information can be actually exchanged therebetween.

According to the technique disclosed in the Patent Document 2, there is provided a single analog detection section capable of receiving and detecting an input signal from the reader/writer, along with a plurality of demodulation circuits each capable of demodulating the output signal from the analog detection circuit by establishing synchronization with a predetermined signal. Also, there are provided a plurality of detection circuits that can each detect a header from the input value, as well as a plurality of data demodulation circuits each outputting demodulated data resulting from the input value and an enable signal per ETU.

Where the technique disclosed in the Patent Document 2 is in use, the results of header detection output from the multiple detection circuits are examined to determine which of a plurality of predetermined communication methods matches the detected header. With the matching communication method thus determined, one of the results of demodulation by the multiple demodulation circuits is selected according to the selected communication method, and one of the enable signals is selected likewise. The combination of the selected demodulation result with the selected enable signal is then subjected to data processing corresponding to the communication method in effect.

As described, the processes corresponding to a plurality of communication methods are performed in parallel in order to shorten the time required before the connection is established and information can be actually exchanged.

According to the technique of the Patent Document 2, a frame head can be detected simultaneously by a plurality of header detection sections arranged in parallel. This setup makes it possible to identify the communication method compatible with the received signal during the reception of the first frame head.

The end of the frame is determined by matching a frame end signal against a binarized signal per ¼ ETU obtained by binarizing the received signal to a threshold value. The frame end determination can be performed in the same manner as the frame head detection.

It follows that the technique of the Patent Document 2 is faster in determining the applicable communication method than the technique of the Patent Document 1 searching for the communication method in effect by selecting one communication method after another on the part of the reception apparatus until the selected communication method is found to match the received signal. For example, according to the technique of the Patent Document 1, every time the communication method is to be determined, another frame needs to be received. This means that as many frames as the number of communication method candidates may be required to be detected before the matching communication method can be determined. According to the technique of the Patent Document 2, by contrast, a plurality of header detectors are operated in parallel during the reception of a single frame to determine the communication method in use. Thus the communication method determination is completed during the reception of one frame, which appreciably shortens the time required to establish communication.

SUMMARY OF THE INVENTION

Where frame heads and bit coding waveforms are to be detected by matching, noise may intrude on the waveform of the received signal or on the modulated data. In such cases, a communication method different from the correct one may be falsely detected.

Thus in order to determine the applicable communication method during the reception of the first frame, it is necessary to detect a frame head or other components using a plurality of communication methods and to determine if each of a plurality of results thus detected is reliable based on priority.

According to the technique of the Patent Document 2, the communication method of the received signal is determined by matching. Then a plurality of processing circuits are operated exclusively based on the communication method thus determined.

However, the technique of the Patent Document 2 presupposes that every time one frame of the signal is received, a frame head can be determined only once. Furthermore, the Patent Document 2 contains no description as to specific procedures for determining the communication method from the results of frame detection. In other words, where there occur a plurality of results of frame detection including a falsely detected frame, there is no method disclosed for determining how to determine the communication method illustratively by selecting the reliable results frame by frame.

In order to reduce the degradation of performance caused by such false selection of the communication method, it is necessary to provide arrangements for determining the applicable communication method based on more reliable results of frame head detection even where two or more frame heads are found detected during the reception of a single frame.

The present invention has been made in view of the above circumstances and provides a signal processing apparatus and a signal processing method for reliably communicating with the communicating party using one of a plurality of different communication methods while shortening the time it takes to establish the communication.

In carrying out the present invention and according to one embodiment thereof, there is provided a signal processing apparatus including: a plurality of frame head detection means for determining whether a frame head complying with any one of a plurality of different communication methods is detected by comparing the waveform of a signal sent from an external apparatus with a plurality of predetermined different symbol patterns; a communication method selection means for selecting the communication method for communicating with the external apparatus based on results of the determination by the frame head detection means and on the priority of each of the plurality of communication methods; and a priority changing means configured such that if a second communication method different from an initially selected first communication method is selected anew, then the priority changing means changes the priority of each of the plurality of communication methods based on the newly selected second communication method.

Preferably, the signal processing apparatus of the embodiments of the present invention may further include a binarized signal sequence generation means for generating a binarized signal sequence by binarizing a detected signal obtained by detecting the signal sent from the external apparatus, at a predetermined sampling rate and at a predetermined threshold value; wherein each of the frame head detection means may compare each of symbols obtained from the binarized signal sequence with the plurality of different symbol patterns.

Preferably, the signal processing apparatus of the embodiments of the present invention may further include a plurality of demodulation means for demodulating the signal sent from the external apparatus into demodulated data using demodulation methods corresponding to the plurality of communication methods while generating enable signals corresponding to the demodulated data.

Preferably, the priority above may be determined based on the number of symbols in the frame head complying with each of the communication methods.

Preferably, the priority above may be determined based on the number of sample points in the frame head complying with each of the communication method.

Preferably, the priority changing means may store in a priority criterion table the priority of each of the plurality of different communication methods selected by the communication method selection means; and the priority changing means may change the priority based on the priority criterion table.

Preferably, the priority changing means may include a demodulation time counting means configured such that upon selection of a communication method by the communication method selection means, the demodulation time counting means may count the time required by the demodulation means corresponding to the communication method being selected; and if the time counted by the demodulation time counting means exceeds a predetermined threshold value, then the priority changing means may change the priority criterion table.

Preferably, the signal processing apparatus of the embodiments of the present invention may further include: a selector configured to selectively output the demodulated data and enable signal generated by the demodulation means corresponding to the communication method selected by the communication method selection means; and a storage means for writing the demodulated data output from the selector to a storage area of a predetermined address based on the enable signal.

Preferably, if the first communication method selected by communication method selection means is superseded by the second communication method selected anew by the communication method selection means, then the storage means may overwrite the storage area of the predetermined address where the demodulated data corresponding to the first communication method is stored, with the demodulated data which is output by the selector and which corresponds to the second communication method.

According to another embodiment of the present invention, there is provided a signal processing method including the steps of: causing a plurality of frame head detection means to determine whether a frame head complying with any one of a plurality of different communication methods is detected by comparing the waveform of a signal sent from an external apparatus with a plurality of predetermined different symbol patterns; causing a communication method selection means to select the communication method for communicating with the external apparatus based on results of the determination by the frame head detection means and on the priority of each of the plurality of communication methods; and if a second communication method different from an initially selected first communication method is selected anew, then causing a priority changing means to change the priority of each of the plurality of communication methods based on the newly selected second communication method.

Where the present invention is embodied as outlined above, checks are made to determine whether a frame head complying with any one of a plurality of different communication methods is detected by comparing the waveform of a signal sent from an external apparatus with a plurality of predetermined different symbol patterns. The communication method is selected for use in communicating with the external apparatus based on results of the determination by the frame head detection means and on the priority of each of the plurality of communication methods. If a second communication method different from an initially selected first communication method is selected anew, then the priority of each of the plurality of communication methods is changed based on the newly selected second communication method.

According to the embodiments of the present invention, communication can be established reliably with a given communicating party using one of a plurality of different communication methods which corresponds to the communicating party in question, and the time it takes to establish the communication can be shortened.

BRIEF DESCRIPTION OF THE DRAWINGS

FIG. 1 is a schematic view explanatory of examples of bit coding by various communication methods;

FIG. 2 is a schematic view explanatory of signal waveforms denoting a start and an end of communication according to various communication methods;

FIG. 11 is a tabular view showing an example of a priority criterion table stored in a priority criterion determination section in FIG. 8;

FIG. 12 is a tabular view showing how selection is made of the communication method corresponding to the frame head detected when the priority criterion table in FIG. 11 is being established;

FIG. 14 is a tabular view showing another example of the priority criterion table stored in the priority criterion determination section in FIG. 8;

FIG. 15 is a tabular view explanatory of how selection is made of the communication method corresponding to the frame head detected when the priority criterion table in FIG. 14 is being established;

FIG. 18 is a tabular view explanatory of how changes are made of the priority criterion table stored in the priority criterion determination section in FIG. 17.

DETAILED DESCRIPTION OF THE PREFERRED EMBODIMENTS

Figure 3:
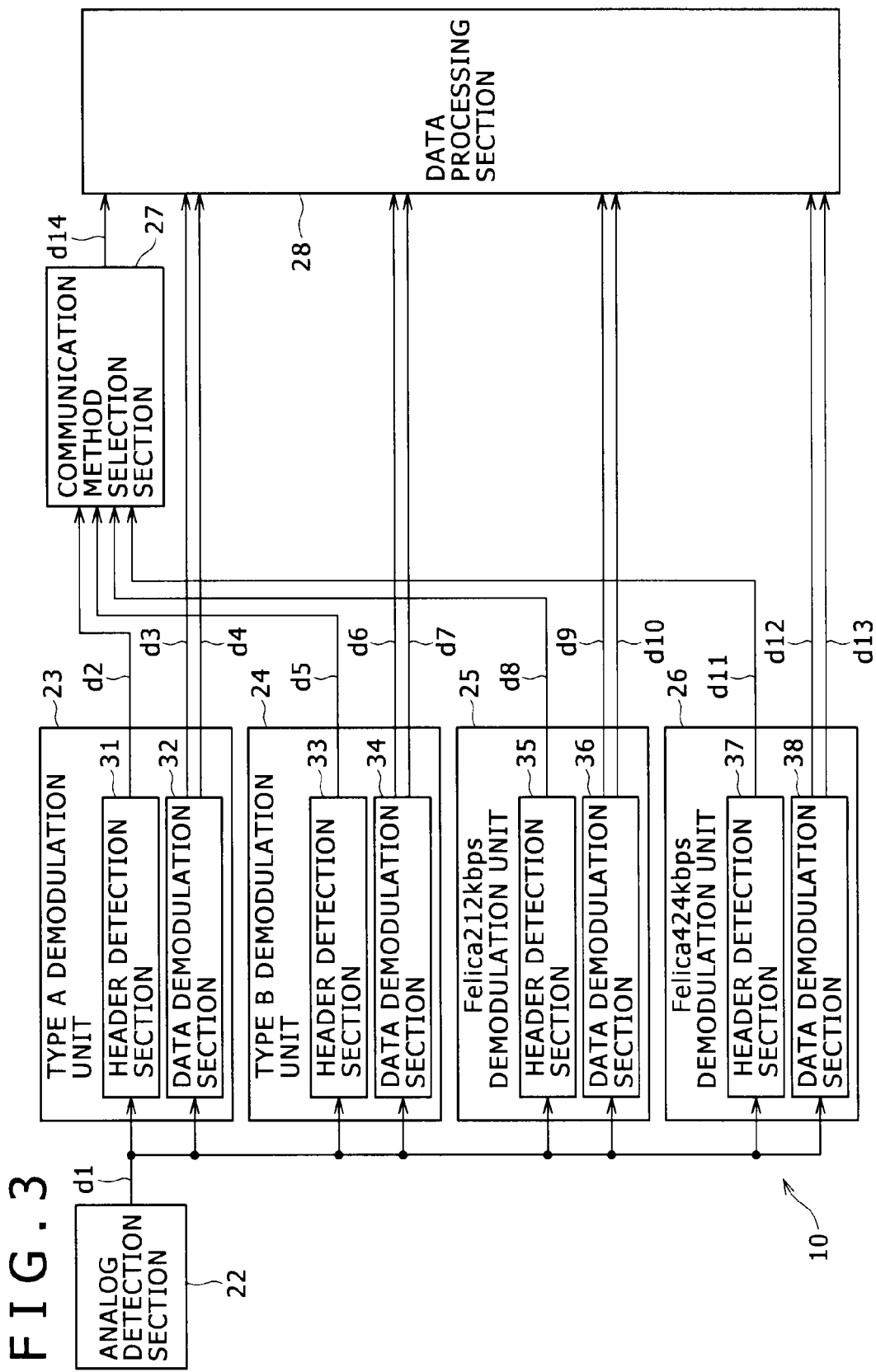
FIG. 3 is a block diagram showing a composition example of an ordinary demodulation section.

Some preferred embodiments of the present invention will now be described by reference to the accompanying drawings. Described first are some ordinary techniques related to the present invention.

The formats of signals transmitted from the reader/writer to the noncontact IC card or vice versa are defined by standards such as ISO 14443 and ISO 18092. There are three types of signal formats defined by these standards: Type A (ISO 14443-A), Type B (ISO 14443-B), and Type C (also called FeliCa type).

The data values transmitted by each of the above-mentioned communication methods are modulated by the bit coding system defined for the communication method in question. One data period representing one-bit data in the modulated signal is referred to as an ETU (Elementary Time Unit).

The Type A format adopts the 100% ASK modulation method. The data to be transmitted in the Type A format from the reader/writer to the noncontact IC card is bit-coded using modified Miller coding. On the other hand, Manchester coding is used to code the data to be transmitted in the Type A format from the noncontact IC card to the reader/writer.

Where data is to be transmitted from the reader/writer to the noncontact IC card in the Type B format, the 10% ASK modulation method is adopted whereby a value "1" is represented by the full amplitude of a carrier signal per ETU and a value "0" is expressed by the carrier signal having a 90% amplitude. Where data is to be transmitted from the noncontact IC card to the reader/writer in the Type B format, BPSK (Binary Phase Shift Keying) is adopted as the modulation method.

With the Type B format, the data to be transmitted from the reader/writer to the noncontact IC card is bit-coded using NRZ (Non Return to Zero) coding. Where data is to be transmitted from the noncontact IC card to the reader/writer in the Type B format, NRZ-L (Non Return to Zero Level) coding is adopted as the coding method.

When transmitting data from the reader/writer to the noncontact IC card, the FeliCa format uses the BPSK modulation method with modulation ratios ranging from 8% to 30% as well as the Manchester coding method. With the FeliCa format, transitions are effected from Low to High levels or vice versa to express a data value "1" or "0" per ETU.

For example, the demodulation section binarizes bit-coded waveforms at a given threshold value at intervals of ¼ ETU, thereby identifying a binarized signal sequence with 4 bits per ETU. This process demodulates the data transmitted from the noncontact IC card.

Illustratively, the threshold value is set to an amplitude ratio of 50% for the Type A format, 95% for the Type B format, and 15% for FeliCa®. The interval in which the waveform is higher than the threshold value is binarized to a value "1" and the interval where the waveform is lower than the threshold value is binarized to a value "0."

FIG. 1 is a schematic view explanatory of examples of bit coding by the communication methods of the Type A format, Type B format, and FeliCa format. In FIG. 1, the horizontal axis stands for time and the vertical axis for signal levels. Shown graphically in the figure are waveforms that correspond to various symbols (data values). An arrow shown under each waveform represents a single ETU period. These waveforms are assumed to be in effect when data is transmitted from the reader/writer to the noncontact IC card by each of the aforementioned communication systems.

As shown in FIG. 1, the waveform of the data value "1" in the Type A format is ASK-modulated by 100% upon elapse of ½ ETU. That is, the first-half (½) ETU period constitutes a signal with its amplitude increased by a superposed carrier. The carrier is stopped upon start of the second-half (½) ETU period so that the amplitude of the waveform at that point is reduced.

The waveform above is binarized when its amplitude ratio is compared with a predetermined threshold value at intervals of ¼ ETU. The process provides a binarized signal sequence of [1, 1, 0, 1]. The sequence indicative of the data value "1" in the Type A format is called the sequence X.

One signal waveform denoting the data value "0" in the Type A format remains unmodulated (i.e., not ASK-modulated) over one ETU period. This waveform is binarized when its amplitude ratio is compared with the given threshold value at intervals of ¼ ETU, whereby a binarized signal sequence of [1, 1, 1, 1] is acquired. The sequence indicative of the data value "0" in the Type A format is called the sequence Y.

Another signal waveform denoting the data value "0" in the Type A format is reduced in amplitude when ASK-modulated by 100% upon start of one ETU period. Thereafter, the waveform remains unmodified so that it is increased in amplitude.

The waveform above is binarized when its amplitude ratio is compared with the threshold value at intervals of ¼ ETU, whereby a binarized signal sequence of [0, 1, 1, 1] is obtained. The sequence indicative of the data value "0" in the Type A format is called the sequence Z.

As shown in FIG. 1, the signal waveform of the data value "1" in the Type B format is one which remains unmodified (i.e., not ASK-modulated) over one ETU period. This waveform is binarized when its amplitude ratio is compared with the threshold value at intervals of ¼ ETU, whereby a binarized signal sequence of [1, 1, 1, 1] is obtained.

The waveform denoting the data value "0" in the Type B format is ASK-modulated by 10% over one ETU period. That means the amplitude of the signal is 90% compared with that of the signal being not ASK-modulated. This waveform is binarized when its amplitude is compared with the threshold value at intervals of ¼ ETU, whereby a binarized signal sequence of [0, 0, 0, 0] is obtained.

The waveform of the data value "1" in the FeliCa format is BPSK-modulated upon elapse of a time period corresponding to ½ ETU. That is, the signal has its amplitude increased in the first-half (½) ETU period and reduced in the second-half (½) ETU period. This waveform is binarized when its amplitude ratio is compared with the threshold value at intervals of ¼ ETU, whereby a binarized signal sequence of [1, 1, 0, 0] is obtained.

The waveform representative of the data value "0" in the FeliCa format is BPSK-modulated in the first-half (½) ETU period. That is, the signal has its amplitude reduced in the first-half (½) ETU period and increased in the second-half (½) ETU period. This waveform is binarized when its amplitude ratio is compared with the threshold value at intervals of ¼ ETU, whereby a binarized signal sequence of [0, 0, 1, 1] is obtained.

Each of the above-described three communication methods has information defined differently to represent a start of communication (frame head) and an end of communication. Illustratively for the Type A format, the information indicating a start of communication is defined as the arrival of a predetermined binarized signal sequence as the received signal in the first ETU. Also for the Type A format, the information representing an end of communication is defined as the arrival of a binarized signal sequence in which a data value "0" is followed by a non-modulation interval.

Illustratively for the Type B format, a binarized signal sequence of SOF (10-bit value "0" and 2-bit value "1") is defined as a frame head. Also for the Type B format, a binary signal sequence with the data value "1" and the data value "0" for 10 ETU's is defined as the information denoting an end of communication.

Illustratively for the FeliCa format, a binarized signal sequence called "Preamble+Sync" appearing at a start of communication is defined as a frame head. "Preamble" is a binarized signal sequence made up of zeros of at least 48 bits, and "Sync" is a binarized signal sequence corresponding to 16 bits representing "B24D" in hexadecimal notation. Also for the FeliCa format, the arrival of a non-modulation interval (amplitude unmodulated in both the first-half (½) ETU and the second-half (½) ETU) is defined as the information denoting an end of communication.

FIG. 2 is a schematic view explanatory of signal waveforms denoting a start and an end of communication according to the communication methods of the Type A format, Type B format, and FeliCa format. In FIG. 2, the horizontal axis stands for time and the vertical axis for signal levels. Shown graphically in the figure are waveforms that correspond to signals each indicative of a start and an end of communication. These waveforms are assumed to be in effect when data is transmitted from the reader/writer to the noncontact IC card by each of the aforementioned communication systems.

The signal waveform indicative of a start of communication in the Type A format corresponds to the sequence Z, i.e., a binarized signal sequence as the received signal in the first ETU. This is a signal whose amplitude is reduced upon 100% ASK modulation at a start of one ETU period. Thereafter the signal has its amplitude increased when left unmodified (i.e., not ASK-modulated). The symbol representative of a start of communication in the Type A format is called the SOC as well.

The signal waveform indicative of an end of communication in the Type A format corresponds to a binarized signal sequence in which a data value "0" is followed by a non-modulation interval. The typical waveforms shown in FIG. 2 include one which corresponds to a binarized signal sequence wherein a sequence Z is followed by a sequence Y (unmodulated symbol). The signal representative of an end of communication in the Type A format may also be a binarized signal sequence in which a sequence Y is followed by another sequence Y.

The signal waveform denoting a start of communication in the Type B format corresponds to a binarized signal sequence part representative of a 10-bit data value "0" followed by a binarized signal sequence part expressive of a two-bit data value "1." This binarized signal sequence is called the SOF.

The signal waveform denoting an end of communication in the Type B format corresponds to a binarized signal sequence part representative of a one-bit data value "1" followed by a binarized signal sequence part expressive of a 10-bit data value "0." The binarized signal sequence expressive of a 10-bit data value "0" is called an EOF.

The signal waveform indicating a start of communication in the FeliCa format corresponds to a binarized signal sequence called "Preamble+Sync." "Preamble" is a binarized signal sequence made up of zeros of at least 48 bits, and "Sync" is a binarized signal sequence corresponding to 16 bits representing "B24D" in hexadecimal notation. The 16 bits representative of "B24D" are "1011001001001101." The signal denoting an end of communication in the FeliCa format is a non-modulated signal.

As described above, different communication methods utilize different signal waveforms to denote a start and an end of communication. Also, the bit length of the data (i.e., ETU count) transmitted by the signal indicative of a start or an end of communication differs from one communication method to another.

Furthermore, according to ISO 14443 and ISO 18092, there are four bit rates (106 kbps, 212 kbps, 424 kbps, 847 kbps) for the data to be transmitted in the Type A and Type B formats. There are two bit rates (212 kbps, 424 kbps) for the data to be transmitted in the FeliCa format.

From now on, the types and communication rates of noncontact IC cards are expected to grow. Under these circumstances, noncontact IC cards capable of communicating with reader/writers operating on different communication methods have been developed.

FIG. 3 is a block diagram showing a composition example of the demodulation section as part of an ordinary noncontact IC card. This demodulation section is designed to be compatible with the communication methods of the Type A format, Type B format, and FeliCa format. The demodulation section is constituted on the assumption that the bit rate for the data to be transmitted in the Type A format and Type B format is 106 kbps and that the bit rate for the data to be transmitted in the FeliCa format is 212 kbps or 424 kbps.

The demodulation section 10 in FIG. 3 is structured to include an analog detection section 22, a Type A demodulation unit 23, a Type B demodulation unit 24, a FeliCa 424-kbps demodulation unit 26, and a FeliCa 212-kbps demodulation unit 25. The demodulation section 10 also includes a communication method selection section 27 and a data processing section 28.

The analog detection section 22 subjects the signal coming from a reader/writer to analog orthogonal detection or to analog envelope detection. A detected signal output from the analog detection section 22 is sent via a signal line d1 to the Type A demodulation unit 23, Type B demodulation unit 24, FeliCa 424-kbps demodulation unit 26, and FeliCa 212-kbps demodulation unit 25. In the ensuing description, the signal transmitted via the signal line d1 will be referred to as the signal d1.

The Type A demodulation unit 23, Type B demodulation unit 24, FeliCa 424-kbps demodulation unit 26, and FeliCa 212-kbps demodulation unit 25 are each designed to process the signal d1 illustratively through over-sampling at a predetermined clock rate.

That is, each of the Type A demodulation unit 23, Type B demodulation unit 24, FeliCa 424-kbps demodulation unit 26, and FeliCa 212-kbps demodulation unit 25 is capable of processing the signal d1 illustratively as a binarized signal sequence obtained by binarizing the signal d1 at intervals of ¼ ETU. Since the demodulation method is predetermined for each of the communication methods as discussed above, each of the Type A demodulation unit 23, Type B demodulation unit 24, FeliCa 424-kbps demodulation unit 26, and FeliCa 212-kbps demodulation unit 25 binarizes the signal d1 using the threshold value corresponding to the matching communication method.

The Type A demodulation unit 23 contains a header detection section 31 and a data demodulation section 32. The header detection section 31 detects a signal (frame head) denoting a start of communication in the Type A format illustratively on the basis of the binarized signal sequence obtained by binarizing the signal d1 at an amplitude ratio of 50% as the threshold value. That is, the frame head for the Type A format is detected as described above in reference to FIG. 2. When the frame head is detected, a detected signal is output as a signal d2.

The data demodulation section 32 demodulates symbols of the Type A format. Specifically, based on the binarized signal sequence obtained by binarizing the signal d1 at the amplitude ratio of 50% as the threshold value, the data demodulation section 32 detects symbols such as the sequence X, sequence Y and sequence Z discussed above by reference to FIG. 1. The data demodulation section 32 outputs the data value related to each symbol as a signal d3. The data demodulation section 32 further generates an enable signal for determining the ETU's for the Type A format, and outputs the generated enable signal as a signal d4.

Likewise, the Type B demodulation unit 24 contains a header detection section 33 and a data demodulation section 34. The header detection section 33 detects a signal (frame head) denoting a start of communication in the Type B format illustratively on the basis of the binarized signal sequence obtained by binarizing the signal d1 at an amplitude ratio of 95% as the threshold value. That is, an SOF as the frame head for the Type B format is detected as described above in reference to FIG. 2. When the frame head is detected, a detected signal is output as a signal d5.

The data demodulation section 34 demodulates symbols of the Type B format. Specifically, based on the binarized signal sequence obtained by binarizing the signal d1 at the amplitude ratio of 95% as the threshold value, the data demodulation section 34 detects the symbols discussed above by reference to FIG. 1. The data demodulation section 34 outputs the data value related to each symbol as a signal d6. The data demodulation section 34 further generates an enable signal for determining the ETU's for the Type B format, and outputs the generated enable signal as a signal d7.

The FeliCa 212-kbps demodulation unit 25 contains a header detection section 35 and a data demodulation section 36. The header detection section 35 detects a signal (frame head) denoting a start of communication in the FeliCa format illustratively on the basis of the binarized signal sequence obtained by binarizing the signal d1 at an amplitude ratio of 15% as the threshold value. That is, "Preamble+Sync" as the frame head for the FeliCa format is detected as described above in reference to FIG. 2. When the frame head is detected, a detected signal is output as a signal d8.

The data demodulation section 36 demodulates symbols of the FeliCa format. Specifically, based on the binarized signal sequence obtained by binarizing the signal d1 at the amplitude ratio of 15% as the threshold value, the data demodulation section 36 detects the symbols discussed above by reference to FIG. 1. The data demodulation section 36 outputs the data value related to each symbol as a signal d9. The data demodulation section 36 further generates an enable signal for determining the ETU's for the FeliCa format at the communication rate of 212 kbps, and outputs the generated enable signal as a signal d10.

The FeliCa 424-kbps demodulation unit 26 contains a header detection section 37 and a data demodulation section 38. The header detection section 37 detects a signal (frame head) denoting a start of communication in the FeliCa format illustratively on the basis of the binarized signal sequence obtained by binarizing the signal d1 at the amplitude ratio of 15% as the threshold value. That is, "Preamble+Sync" as the frame head for the FeliCa format is detected as described above in reference to FIG. 2. When the frame head is detected, a detected signal is output as a signal d11.

The data demodulation section 38 demodulates symbols of the FeliCa format. Specifically, based on the binarized signal sequence obtained by binarizing the signal d1 at the amplitude ratio of 15% as the threshold value, the data demodulation section 36 detects the symbols discussed above by reference to FIG. 1. The data demodulation section 38 outputs the data value related to each symbol as a signal d12. The data demodulation section 38 further generates an enable signal for determining the ETU's for the FeliCa format at the communication rate of 424 kbps, and outputs the generated enable signal as a signal d13.

The communication method selection section 27 determines which communication method the detected frame head corresponds to on the basis of the signals d2, d5, d8, and d11. For example, if the signal d2 is driven High, then the communication method selection section 27 determines that the frame head of the Type A format is detected. Following the determination, the communication method selection section 27 sends a signal indicative of the communication method of the noncontact IC card (Type A in this case) to the data processing section 28 via a signal line d14.

The data processing section 28 is designed to determine the communication method based on the signal d14 and to accept and to process only the data and enable signal corresponding to the communication method thus determined. For example, if the signal denoting the Type A format is supplied as the signal d14, then the data processing section 28 processes the data given as the signal d3 based on the enable signal fed as the signal d4, and discards all other signals.

FIGS. 4A through 4M are timing charts explanatory of the operations performed by the demodulation section 10 when signals of the Type A format are received from the reader/writer.

Figure 4:
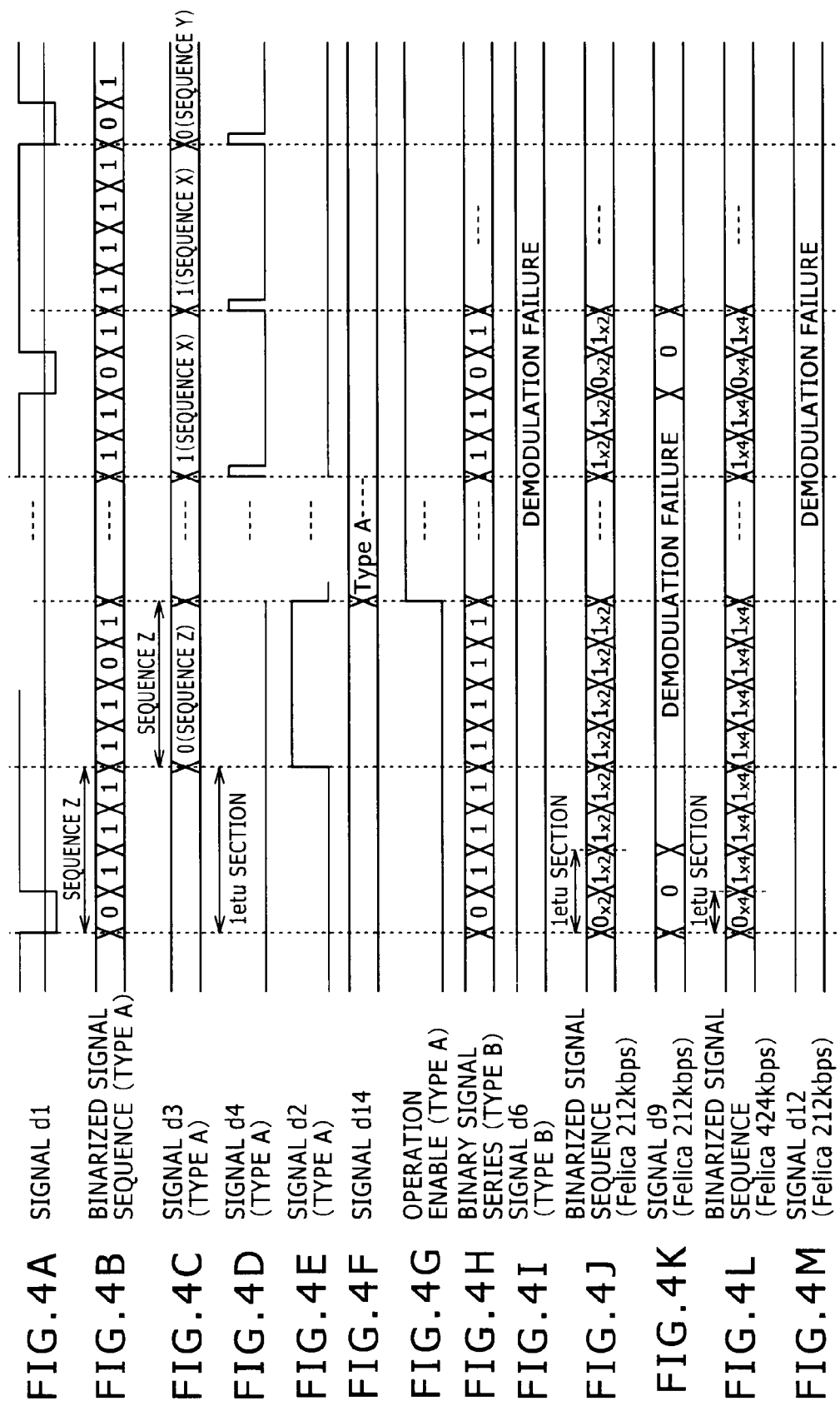
FIGS. 4A through 4M are timing charts explanatory of the operations of the demodulation section shown in FIG. 3.

FIG. 4A shows the waveform of the signal d1. FIG. 4B indicates the binarized signal sequence obtained by binarizing the signal d1 at intervals of ¼ ETU using the threshold value for the Type A format. In this example, the binarized signal sequence in FIG. 4B includes a sequence Z, a sequence X, . . . , a sequence X, and a sequence Y.

FIG. 4C shows data values represented by the waveform of the signal d3. In this example, data values "0," . . . "1," "1," "0" are indicated.

FIG. 4D shows the waveform of the signal d4. As shown in FIG. 4D, the signal d4 as an enable signal constitutes pulses denoting the timing of the start of each ETU.

FIG. 4E shows the waveform of the signal d2. In this example, the signal d2 being driven High indicates that the frame head of the Type A format is detected. In other words, upon detection of the sequence Z as the frame head of the Type A format, the signal d2 is driven High.

FIG. 4F shows the information given by the signal d14. In this example, the information indicative of the Type A format is output in the ETU immediately following an ETU in which the signal d2 is driven High.

FIG. 4G shows the waveform of an operation enable signal generated within the data processing section 28. In this example, at the same time as the information indicative of the Type A format is output by the signal d14, the operation enable signal is driven High. The data processing section 28 is configured so that after the operation enable signal is driven High, the data processing section 28 processes the communication method data (signal d3 in this case) given by the signal d14.

FIG. 4H shows the binarized signal sequence obtained by binarizing the signal d1 at intervals of ¼ ETU using the threshold value for the Type B format. Since the signal d1 is a detected signal acquired upon receipt of the signal in the Type A format, it is difficult to obtain the Type B format symbols discussed above in reference to FIG. 1, from the binarized signal sequence acquired by binarizing the signal d1 at intervals of ¼ ETU using the threshold value for the Type B format. That means the data demodulation section 34 may not demodulate data correctly.

FIG. 4I shows data values given by the waveform of the signal d6. This, however, turns out to be a failed demodulation as explained above.

FIG. 4J shows the binarized signal sequence obtained by binarizing the signal d1 at intervals of ¼ ETU using the threshold value for the FeliCa format. What is shown in FIG. 4J corresponds to the communication rate of 212 kbps. That means the time period corresponding to one ETU is half that of the Type A or Type B format. For this reason, FIG. 4J gives a notation of "0×2," which means a binarized signal indicative of "0" occurs twice in a row.

Since the signal d1 is a detected signal acquired upon receipt of the signal in the Type A format, it is difficult to obtain the FeliCa format symbols discussed above in reference to FIG. 1, from the binarized signal sequence acquired by binarizing the signal d1 at intervals of ¼ ETU using the threshold value for the FeliCa format. That means the data demodulation section 36 may not demodulate data correctly.

FIG. 4K shows data values given by the waveform of the signal d9. However, this also turns out to be a failed demodulation because of the inability to demodulate data correctly as explained above.

FIG. 4L shows the binarized signal sequence obtained by binarizing the signal d1 at intervals of ¼ ETU using the threshold value for the FeliCa format. What is shown in FIG. 4L corresponds to the communication rate of 424 kbps. That means the time period corresponding to one ETU is one-fourth that of the Type A or Type B format. For this reason, FIG. 4L gives a notation of "0×4," which means a binarized signal indicative of "0" occurs four times in a row.

Since the signal d1 is a detected signal acquired upon receipt of the signal in the Type A format, it is difficult to obtain the FeliCa format symbols discussed above in reference to FIG. 1, from the binarized signal sequence acquired by binarizing the signal d1 at intervals of ¼ ETU using the threshold value for the FeliCa format. That means the data demodulation section 38 may not demodulate data correctly.

FIG. 4M shows data values given by the waveform of the signal d12. However, this also turns out to be a failed demodulation because of the inability to demodulate data correctly as explained above.

In the manner described above, upon receipt of the signal in the Type A format, the data processing section of the demodulation section 10 can process data based on the signals fed from the Type A demodulation unit 23.

FIGS. 5A through 5M are other timing charts explanatory of the operations performed by the demodulation section 10 when signals in the Type B format are received from the reader/writer.

Figure 5:
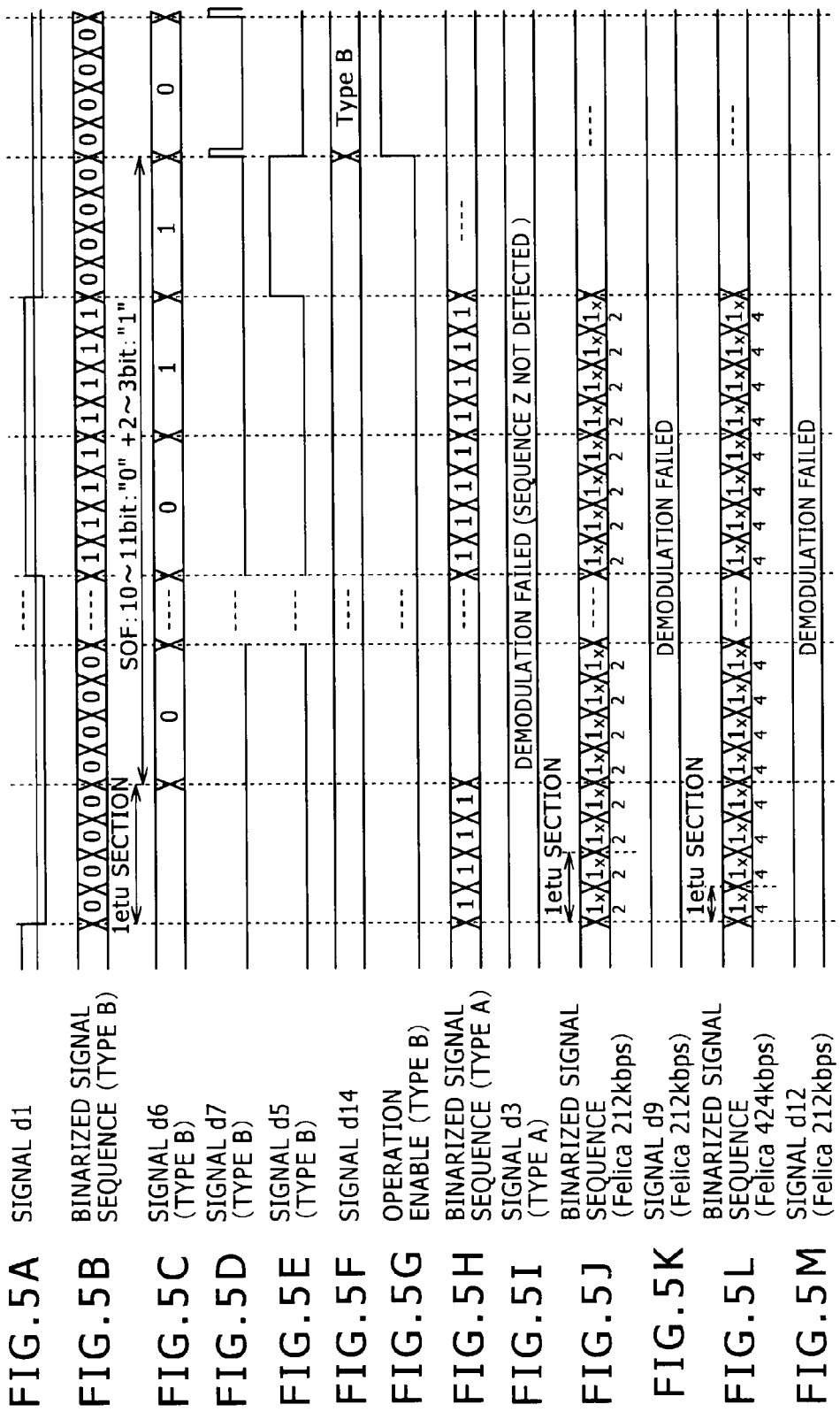
FIGS. 5A through 5M are other timing charts explanatory of the operations of the demodulation section in FIG. 3.

FIG. 5A shows the waveform of the signal d1. FIG. 5B indicates the binarized signal sequence obtained by binarizing the signal d1 at intervals of ¼ ETU using the threshold value for the Type B format.

FIG. 5C shows data values represented by the waveform of the signal d6. In this example, data values "0," . . . "0," "1," "1," and "0" are indicated.

FIG. 5D shows the waveform of the signal d7. As shown in FIG. 5D, the signal d7 as an enable signal constitutes pulses denoting the timing of the start of each ETU.

FIG. 5E shows the waveform of the signal d5. In this example, the signal d5 being driven High indicates that the frame head of the Type B format is detected. In other words, upon detection of the SOF as the frame head of the Type B format, the signal d5 is driven High.

FIG. 5F shows the information given by the signal d14. In this example, the information indicative of the Type B format is output in the ETU immediately following an ETU in which the signal d5 is driven High.

FIG. 5G shows the waveform of an operation enable signal generated within the data processing section 28. In this example, at the same time as the information indicative of the Type B format is output by the signal d14, the operation enable signal is driven High. The data processing section 28 is configured so that after the operation enable signal is driven High, the data processing section 28 processes the communication method data (signal d6 in this case) given by the signal d14.

FIG. 5H shows the binarized signal sequence obtained by binarizing the signal d1 at intervals of ¼ ETU using the threshold value for the Type A format. Since the signal d1 is a detected signal acquired upon receipt of the signal in the Type B format, it is difficult to obtain the Type A format symbols discussed above in reference to FIG. 1, from the binarized signal sequence acquired by binarizing the signal d1 at intervals of ¼ ETU using the threshold value for the Type A format. That means the data demodulation section 32 may not demodulate data correctly.

FIG. 5I shows data values given by the waveform of the signal d6. This, however, turns out to be a failed demodulation as explained above.

FIG. 5J shows the binarized signal sequence obtained by binarizing the signal d1 at intervals of ¼ ETU using the threshold value for the FeliCa format.

Since the signal d1 is a detected signal acquired upon receipt of the signal in the Type B format, it is difficult to obtain the FeliCa format symbols discussed above in reference to FIG. 1, from the binarized signal sequence acquired by binarizing the signal d1 at intervals of ¼ ETU using the threshold value for the FeliCa format. That means the data demodulation section 36 may not demodulate data correctly.

FIG. 5K shows data values given by the waveform of the signal d9. However, this also turns out to be a failed demodulation because of the inability to demodulate data correctly as explained above.

FIG. 5L shows the binarized signal sequence obtained by binarizing the signal d1 at intervals of ¼ ETU using the threshold value for the FeliCa format.

Since the signal d1 is a detected signal acquired upon receipt of the signal in the Type B format, it is difficult to obtain the FeliCa format symbols discussed above in reference to FIG. 1, from the binarized signal sequence acquired by binarizing the signal d1 at intervals of ¼ ETU using the threshold value for the FeliCa format. That means the data demodulation section 38 may not demodulate data correctly.

FIG. 5M shows data values given by the waveform of the signal d12. However, this also turns out to be a failed demodulation because of the inability to demodulate data correctly as explained above.

In the manner described above, upon receipt of the signal in the Type B format, the data processing section of the demodulation section 10 can process data based on the signals fed from the Type B demodulation unit 24.

FIGS. 6A through 6M are other timing charts explanatory of the operations performed by the demodulation section 10 when signals in the FeliCa format are received at the communication rate of 212 kbps from the reader/writer.

Figure 6:
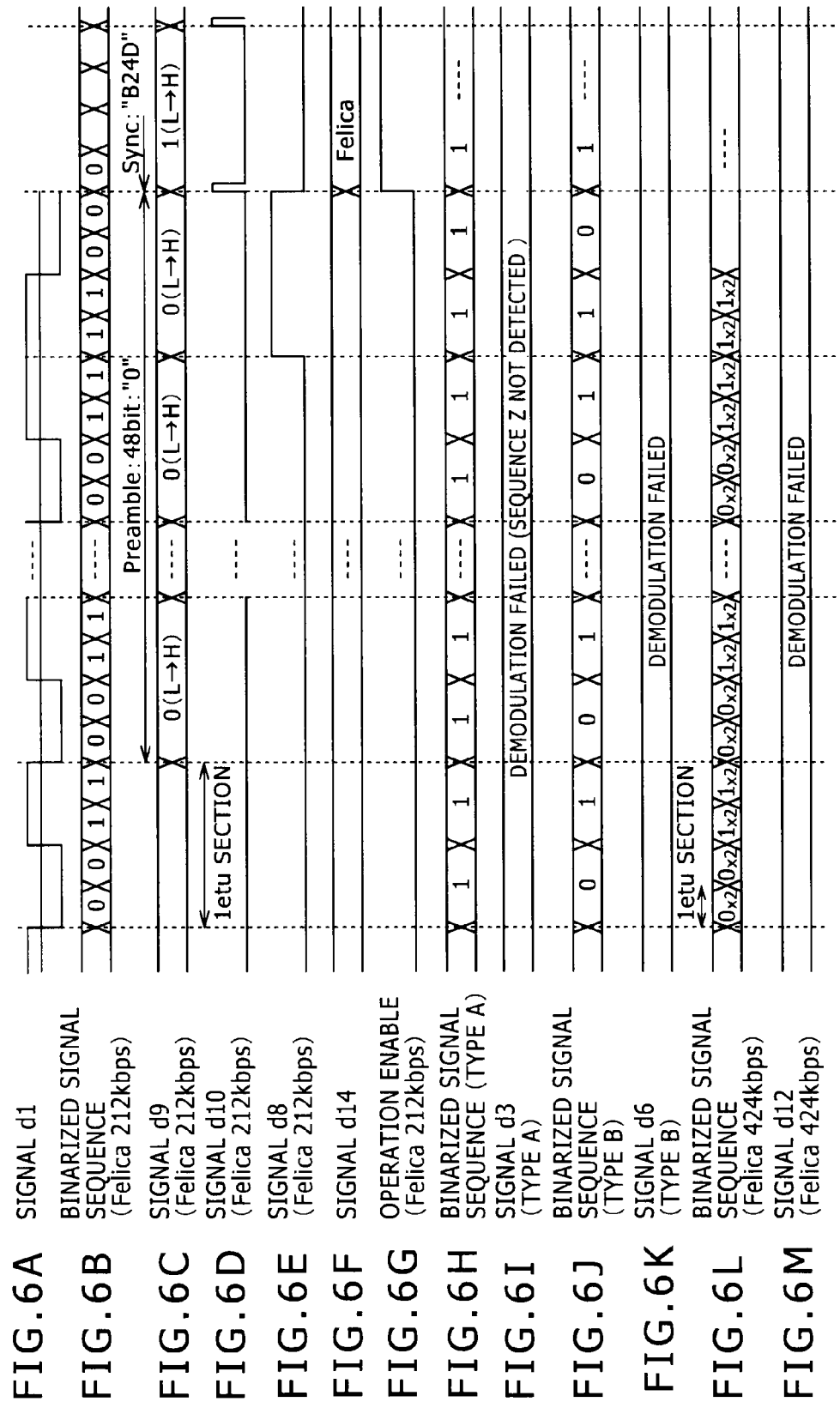
FIGS. 6A through 6M are other timing charts explanatory of the operations of the demodulation section in FIG. 3.

FIG. 6A shows the waveform of the signal d1. FIG. 6B indicates the binarized signal sequence obtained by binarizing the signal d1 at intervals of ¼ ETU using the threshold value for the FeliCa format. It should be noted that one ETU period shown in FIG. 6A corresponds to ½ ETU in FIGS. 6H and 6J and to two ETU's in FIG. 6L.

FIG. 6C shows data values represented by the waveform of the signal d9. In this example, data values "0," ... "0," "0," and "1" are indicated.

FIG. 6D shows the waveform of the signal d10. As shown in FIG. 6D, the signal d10 as an enable signal constitutes pulses denoting the timing of the start of each ETU.

FIG. 6E shows the waveform of the signal d8. In this example, the signal d2 being driven High indicates that the frame head of the FeliCa format is detected. In other words, upon detection of "Preamble+Sync" as the frame head of the FeliCa format, the signal d8 is driven High.

FIG. 6F shows the information given by the signal d8. In this example, the information indicative of the FeliCa format at the communication rate of 212 kbps is output in the ETU immediately following an ETU in which the signal d8 is driven High.

FIG. 6G shows the waveform of an operation enable signal generated within the data processing section 28. In this example, at the same time as the information indicative of the FeliCa format at 212 kbps is output by the signal d14, the operation enable signal is driven High. The data processing section 28 is configured so that after the operation enable signal is driven High, the data processing section 28 processes the communication method data (signal d9 in this case) given by the signal d14.

FIG. 6H shows the binarized signal sequence obtained by binarizing the signal d1 at intervals of ¼ ETU using the threshold value for the Type A format. Since the signal d1 is a detected signal acquired upon receipt of the signal in the FeliCa format at the communication rate of 212 kbps, it is difficult to obtain the Type A format symbols discussed above in reference to FIG. 1, from the binarized signal sequence acquired by binarizing the signal d1 at intervals of ¼ ETU using the threshold value for the Type A format. That means the data demodulation section 32 may not demodulate data correctly.

FIG. 6I shows data values given by the waveform of the signal d3. This, however, turns out to be a failed demodulation as explained above.

FIG. 6J shows the binarized signal sequence obtained by binarizing the signal d1 at intervals of ¼ ETU using the threshold value for the Type B format.

Since the signal d1 is a detected signal acquired upon receipt of the signal in the FeliCa format at the communication rate of 212 kbps, it is difficult to obtain the Type B format symbols discussed above in reference to FIG. 1, from the binarized signal sequence acquired by binarizing the signal d1 at intervals of ¼ ETU using the threshold value for the FeliCa format. That means the data demodulation section 34 may not demodulate data correctly.

FIG. 6K shows data values given by the waveform of the signal d6. However, this also turns out to be a failed demodulation because of the inability to demodulate data correctly as explained above.

FIG. 6L shows the binarized signal sequence obtained by binarizing the signal d1 at intervals of ¼ ETU using the threshold value for the FeliCa format. What is shown in FIG. 6L corresponds to the communication rate of 424 kbps.

Since the signal d1 is a detected signal acquired upon receipt of the signal in the FeliCa format at the communication rate of 212 kbps, it is difficult to obtain the FeliCa format symbols at 424 kbps discussed above in reference to FIG. 1, from the binarized signal sequence acquired by binarizing the signal d1 at intervals of ¼ ETU using the threshold value for the FeliCa format. That means the data demodulation section 38 may not demodulate data correctly.

FIG. 6M shows data values given by the waveform of the signal d12. However, this also turns out to be a failed demodulation because of the inability to demodulate data correctly as explained above.

In the manner described above, upon receipt of the signal in the FeliCa format at the communication rate of 212 kbps, the data processing section of the demodulation section 10 can process data based on the signals fed from the FeliCa 212-kbps demodulation unit 25.

However, if noise intrudes on the waveform of the received signal or on the demodulation result data upon detection of the frame head, a communication method different from the correct method can be falsely determined. For example, although the received signal is actually a signal in the Type B format, the demodulation section 10 may erroneously determine that a signal in the Type A format has been received.

FIGS. 7A through 7J are other timing charts explanatory of the operations performed by the demodulation section when signals in the Type B format are received from the reader/writer. Different from the examples in FIGS. 5A through 5M, those in FIGS. 7A through 7J are explanatory of how demodulation can fail due to the noise contained in the waveform of the received signal.

Figure 7:
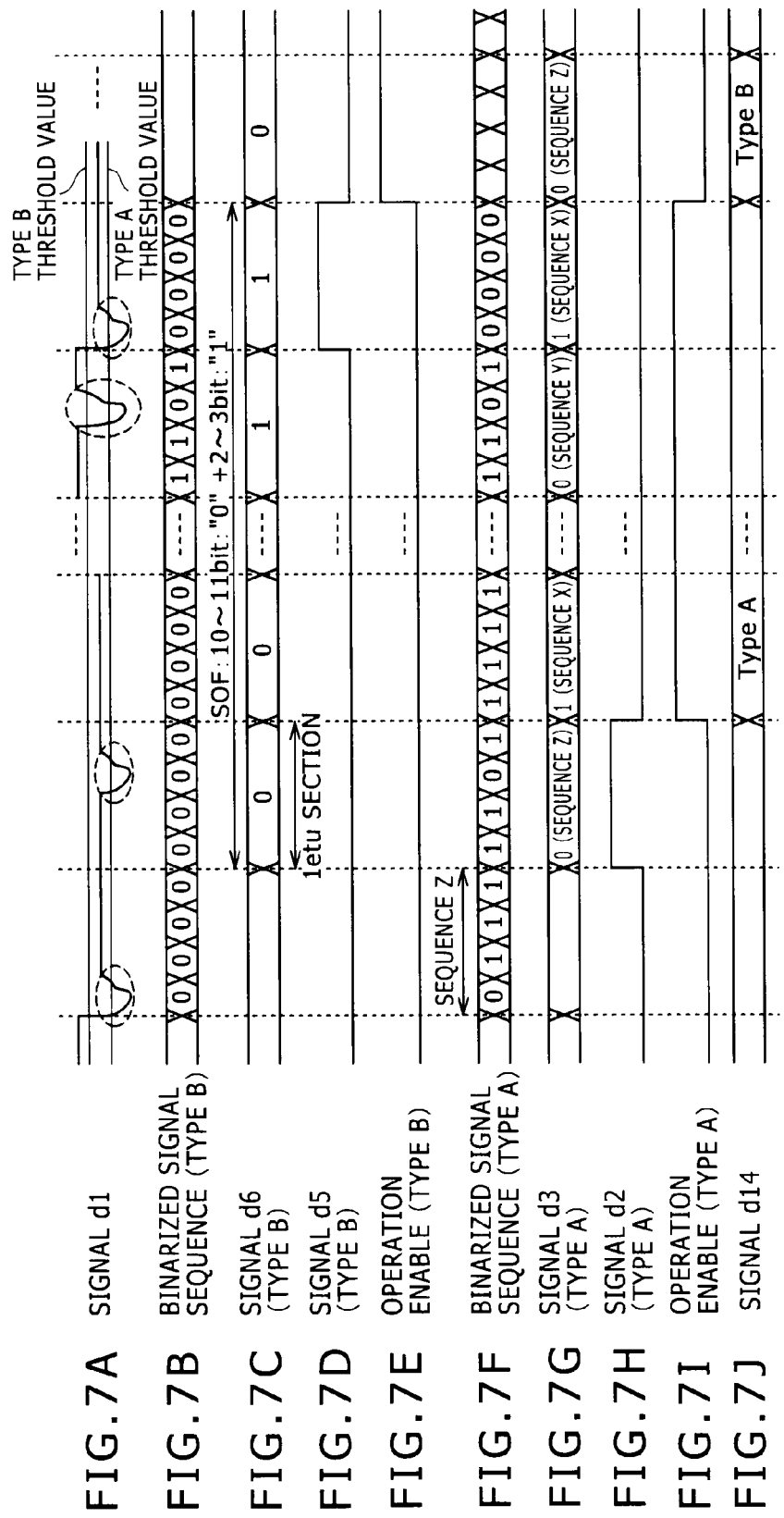
FIGS. 7A through 7J are other timing charts explanatory of the operations of the demodulation section in FIG. 3.

FIG. 7A shows the waveform of the signal d1. FIG. 7B indicates the binarized signal sequence obtained by binarizing the signal d1 at intervals of ¼ ETU using the threshold value for the Type B format. It should be noted that the waveform portions enclosed by broken lines in FIG. 7A are distorted due to noise.

FIG. 7C shows data values represented by the waveform of the signal d6. In this example, data values "0," "0," ... "1," "1," and "0" are indicated.

FIG. 7D shows the waveform of the signal d5. In this example, the signal d5 being driven High indicates that the frame head of the Type B format is detected. In other words, upon detection of an SOF as the frame head of the Type B format, the signal d5 is driven High.

FIG. 7E shows the waveform of an operation enable signal generated within the data processing section 28. In this example, at the same time as the information indicative of the Type B format is output by the signal d14, the operation enable signal is driven High. The data processing section 28 is configured so that after the operation enable signal is driven High, the data processing section 28 processes the Type B format data (signal d6 in this case). This process, however, is not to be performed correctly as will be discussed later.

FIG. 7F shows the binarized signal sequence obtained by binarizing the signal d1 at intervals of ¼ ETU using the threshold value for the Type A format. Since the signal d1 is a detected signal acquired upon receipt of the signal in the Type B format, it is difficult intrinsically to obtain the Type A format symbols discussed above in reference to FIG. 1, from the binarized signal sequence acquired by binarizing the signal d1 at intervals of ¼ ETU using the threshold value for the Type A format.

In the case above, the waveform of the signal d1 is distorted due to noise, with the result that symbols of the sequence Z are falsely detected. This in turn causes the header detection section 31 to output a predetermined signal on the assumption that the frame head of the Type A format has been detected.

FIG. 7G shows data values represented by the waveform of the signal d3. In this case, data values "0," "1," . . . "0," "1," and "0" are output on the false assumption that the signal in the Type A format has been detected as described above.

FIG. 7H shows the waveform of the signal d2. In this example, the signal d2 being driven High indicates that the frame head of the Type A format is detected. In other words, upon detection of a sequence Z as the frame head of the Type A format, the signal d2 is driven High.

FIG. 7I shows the waveform of an operation enable signal generated within the data processing section 28. In this example, at the same time as the information indicative of the Type A format is output by the signal d14, the operation enable signal is driven High. The data processing section 28 is configured so that after the operation enable signal is driven High, the data processing section 28 processes the Type A format data (signal d3 in this case). As a result, the data processing section 28 erroneously processes the signal d3 instead of correctly processing the data transmitted by the signal in the Type B format (signal d6).

FIG. 7J shows the information given by the signal d14. In this example, the information indicative of the Type A format is output in the ETU immediately following an ETU in which the signal d2 is driven High. Furthermore, the information representative of the Type B format is output in the ETU immediately following an ETU in which the signal d5 is driven High.

In the case above, the data processing section 28 may first process the data output as the signal d3 and then keep processing the data output as the signal d6 in keeping with the operation enable signal of FIG. 7E. If it operates in this manner, the demodulation section 10 is obviously unable to process data correctly.

According to the embodiments of the present invention, even if the frame head is falsely detected illustratively due to noise so that a communication method different from the correct method is erroneously determined, the subsequent processing of data can proceed correctly.

Figure 8:
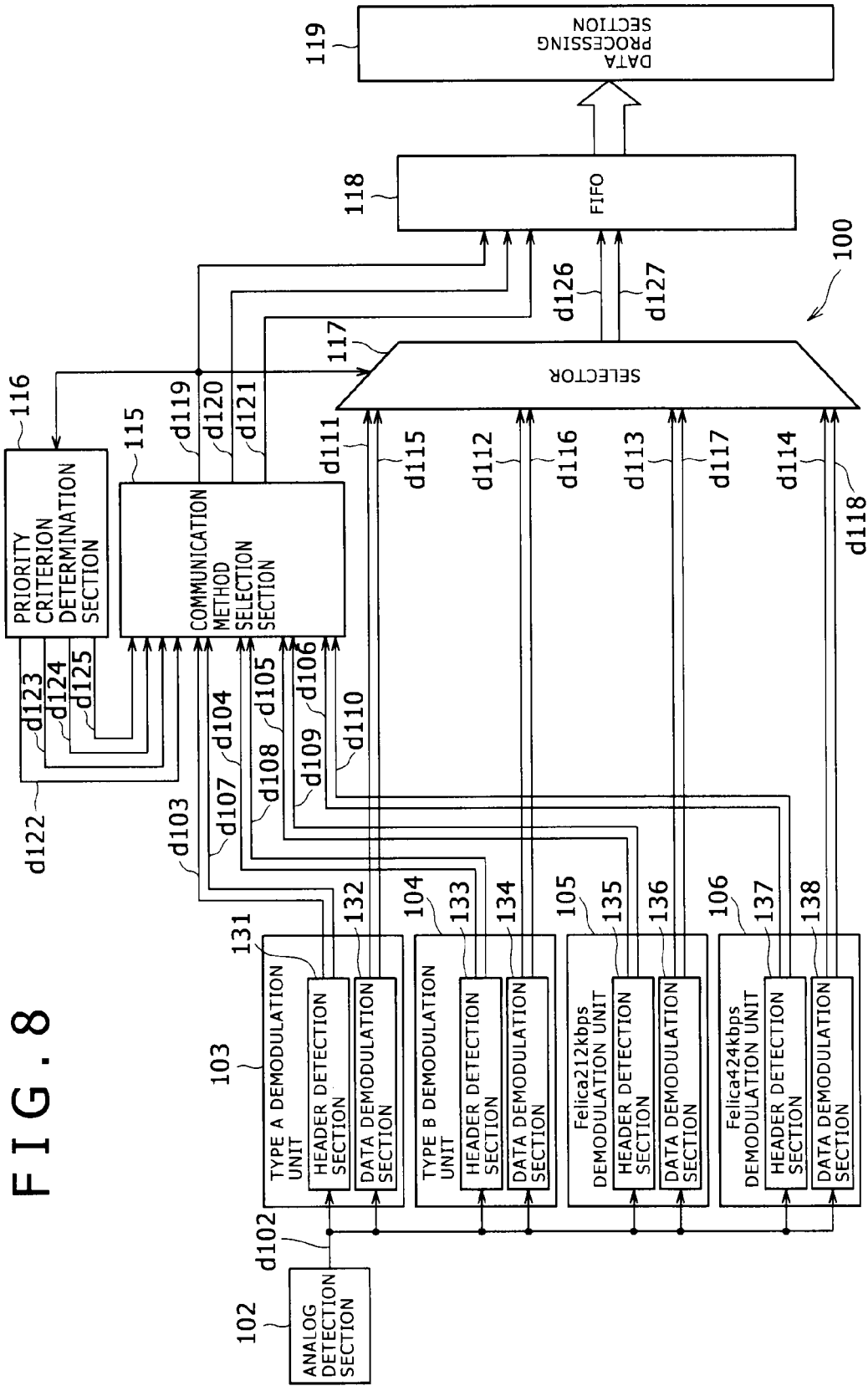
FIG. 8 is a block diagram showing a composition example of a demodulation section as part of an embodiment of the present invention.

FIG. 8 is a block diagram showing a composition example of a demodulation section 100 as part of an embodiment of the present invention. The demodulation section 100 in FIG. 8 is structured illustratively as part of the circuitry of an IC chip mounted on the noncontact IC card.

The demodulation section 100 is designed to be compatible with the communication methods of the Type A format, Type B format, and FeliCa format. The demodulation section 100 is constituted on the assumption that the bit rate for the data to be transmitted in the Type A format and Type B format is 106 kbps and that the bit rate for the data to be transmitted in the FeliCa format is 212 kbps or 424 kbps.

The demodulation section 100 in FIG. 8 is structured to include an analog detection section 102, a Type A demodulation unit 103, a Type B demodulation unit 104, a FeliCa 424-kbps demodulation unit 106, and a FeliCa 212-kbps demodulation unit 105. The demodulation section 100 also includes a communication method selection section 115, a priority criterion determination section 116, a selector 117, an FIFO device 118, and a data processing section 119.

The analog detection section 102 subjects the signal coming from a reader/writer to analog orthogonal detection or to analog envelope detection. A detected signal output from the analog detection section 102 is sent via a signal line d102 to the Type A demodulation unit 103, Type B demodulation unit 104, FeliCa 424-kbps demodulation unit 106, and FeliCa 212-kbps demodulation unit 105.

The Type A demodulation unit 103, Type B demodulation unit 104, FeliCa 424-kbps demodulation unit 106, and FeliCa 212-kbps demodulation unit 105 are each designed to process the signal d102 illustratively through over-sampling at a predetermined clock rate. That is, each of the Type A demodulation unit 103, Type B demodulation unit 104, FeliCa 424-kbps demodulation unit 106, and FeliCa 212-kbps demodulation unit 105 is capable of processing the signal d102 illustratively as a binarized signal sequence obtained by binarizing the signal d102 at intervals of ¼ ETU. Since the demodulation method is predetermined for each of the communication methods as discussed above, each of the Type A demodulation unit 103, Type B demodulation unit 104, FeliCa 424-kbps demodulation unit 106, and FeliCa 212-kbps demodulation unit 105 binarizes the signal d1 using the threshold value corresponding to the matching communication method.

The Type A demodulation unit 103 contains a header detection section 131 and a data demodulation section 132. The header detection section 131 detects a signal (frame head) denoting a start of communication in the Type A format illustratively on the basis of the binarized signal sequence obtained by binarizing the signal d102 at an amplitude ratio of 50% as the threshold value. That is, the frame head for the Type A format is detected as described above in reference to FIG. 2. When the frame head is detected, a detected signal is output as a signal d103.

The header demodulation section 131 detects the signal (EOF) indicative of an end of communication in the Type A format discussed above by reference to FIG. 2. When the EOF is detected, a detected signal is output as a signal d107.

The data demodulation section 132 demodulates symbols of the Type A format. Specifically, based on the binarized signal sequence obtained by binarizing the signal d102 at the amplitude ratio of 50% as the threshold value, the data demodulation section 132 detects symbols such as the sequence X, sequence Y and sequence Z discussed above by reference to FIG. 1. The data demodulation section 132 outputs the data value related to each symbol as a signal d111. The data demodulation section 132 further generates an enable signal for determining the ETU's for the Type A format, and outputs the generated enable signal as a signal d115.

Likewise, the Type B demodulation unit 104 contains a header detection section 133 and a data demodulation section 134. The header detection section 133 detects a signal (frame head) denoting a start of communication in the Type B format illustratively on the basis of the binarized signal sequence obtained by binarizing the signal d102 at an amplitude ratio of 95% as the threshold value. That is, an SOF as the frame head for the Type B format is detected as described above in reference to FIG. 2. When the frame head is detected, a detected signal is output as a signal d105.

The header detection section 133 also detects a signal (EOF) indicative of an end of communication in the Type B format discussed above by reference to FIG. 2. When the EOF is detected, a detected signal is output as a signal d108.

The data demodulation section 134 demodulates symbols of the Type B format. Specifically, based on the binarized signal sequence obtained by binarizing the signal d102 at the amplitude ratio of 95% as the threshold value, the data demodulation section 134 detects the symbols discussed above by reference to FIG. 1. The data demodulation section 34 outputs the data value related to each symbol as a signal d112. The data demodulation section 134 further generates an enable signal for determining the ETU's for the Type B format, and outputs the generated enable signal as a signal d116.

The FeliCa 212-kbps demodulation unit 105 contains a header detection section 135 and a data demodulation section 136. The header detection section 135 detects a signal (frame head) denoting a start of communication in the FeliCa format illustratively on the basis of the binarized signal sequence obtained by binarizing the signal d102 at an amplitude ratio of 15% as the threshold value. That is, "Preamble+Sync" as the frame head for the FeliCa format is detected as described above in reference to FIG. 2. When the frame head is detected, a detected signal is output as a signal d105.

The header detection section 135 also detects a signal (EOF) indicative of an end of communication in the FeliCa format discussed above by reference to FIG. 2. When the EOF is detected, a detected signal is output as a signal d109.

The data demodulation section 136 demodulates symbols of the FeliCa format. Specifically, based on the binarized signal sequence obtained by binarizing the signal d102 at the amplitude ratio of 15% as the threshold value, the data demodulation section 136 detects the symbols discussed above by reference to FIG. 1. The data demodulation section 136 outputs the data value related to each symbol as a signal d113. The data demodulation section 136 further generates an enable signal for determining the ETU's for the FeliCa format at the communication rate of 212 kbps, and outputs the generated enable signal as a signal d117.

The FeliCa 424-kbps demodulation unit 106 contains a header detection section 137 and a data demodulation section 138. The header detection section 137 detects a signal (frame head) denoting a start of communication in the FeliCa format illustratively on the basis of the binarized signal sequence obtained by binarizing the signal d102 at the amplitude ratio of 15% as the threshold value. That is, "Preamble+Sync" as the frame head for the FeliCa format is detected as described above in reference to FIG. 2. When the frame head is detected, a detected signal is output as a signal d106.

The header detection section 137 also detects a signal (EOF) indicative of an end of communication in the FeliCa format discussed above by reference to FIG. 2. When the EOF is detected, a detected signal is output as a signal d110.

The data demodulation section 138 demodulates symbols of the FeliCa format. Specifically, based on the binarized signal sequence obtained by binarizing the signal d102 at the amplitude ratio of 15% as the threshold value, the data demodulation section 138 detects the symbols discussed above by reference to FIG. 1. The data demodulation section 138 outputs the data value related to each symbol as a signal d114. The data demodulation section 138 further generates an enable signal for determining the ETU's for the FeliCa format at the communication rate of 424 kbps, and outputs the generated enable signal as a signal d118.

The Type A demodulation unit 103, Type B demodulation unit 104, FeliCa 424-kbps demodulation unit 106, and FeliCa 212-kbps demodulation unit 105 were explained above on the assumption that the signal d102 is binarized at intervals of ¼ ETU. Alternatively, the analog detection section 102 may binarize the detected signal at intervals of ¼ ETU into a binarized signal sequence that may be fed to the Type A demodulation unit 103, Type B demodulation unit 104, FeliCa 424-kbps demodulation unit 106, and FeliCa 212-kbps demodulation unit 105.

The communication method selection section 115 determines which communication method the detected frame head corresponds to on the basis of the signals d103 through d110. For example, if the signal d103 is driven High, then the communication method selection section 115 determines that the frame head of the Type A format is detected.

Also, if frame heads of a plurality of communication methods are detected, then the communication method selection section 115 determines which communication method should be selected preferentially based on signals d122 through d125 supplied from the priority criterion determination section 116. The communication method selection section 115 proceeds to output a signal d119 denoting the result of the determination.

Illustratively, the signal d119 is generated and output as a two-bit signal that indicates one of the Type A, Type B, FeliCa 212-kbps, and FeliCa 424-kbps communication methods. That is, the signal d119 identifies the communication method selected by the communication method selection section 115.

The communication method selection section 115 generates a frame start signal based on the detected signal of the frame head corresponding to the communication method determined to be selected preferentially as described above. The communication method selection section 115 outputs the frame start signal thus generated as a signal d120. Also, the communication method selection section 115 generates a frame end signal based on the detected signal of the EOF corresponding to the communication method determined to be selected preferentially as discussed above, and outputs the generated frame end signal as a signal d121.

The priority criterion determination section 116 outputs as signals d122 through d125 the signals each indicative of the priority of each of the communication methods in accordance with predetermined priority criteria. Each of the signals indicative of the priority of each of the communication methods will be discussed later in detail.

The selector 117 selectively outputs a signal representative of one of the demodulation results coming from the Type A demodulation unit 103, Type B demodulation unit 104, FeliCa 424-kbps demodulation unit 106, and FeliCa 212-kbps demodulation unit 105. A signal d126 is output as the signal indicative of the data value (demodulated data) in the demodulation result selected by the selector 117. The selector 117 also outputs a signal d127 as an enable signal.

The FIFO device 118 holds the demodulated data supplied as the signal d126 in an internal flip-flop in accordance with the enable signal d127. If the communication method indicated by the signal d119 to be selected preferentially is changed, then the FIFO device 118 discards the demodulated data held in its flip-flop, and retains newly demodulated data along with a signal (information) denoting the new communication method.

Also, the FIFO device 118 notifies the data processing section 119 of an end of reception based on the signal d121 or on a predetermined maximum ETU count.

When notified of the end of communication by the FIFO device 118, the data processing section 119 acquires the demodulated data held in the FIFO 118 together with the signal indicating the communication method in effect, and processes the demodulated data thus obtained.

Figure 9:
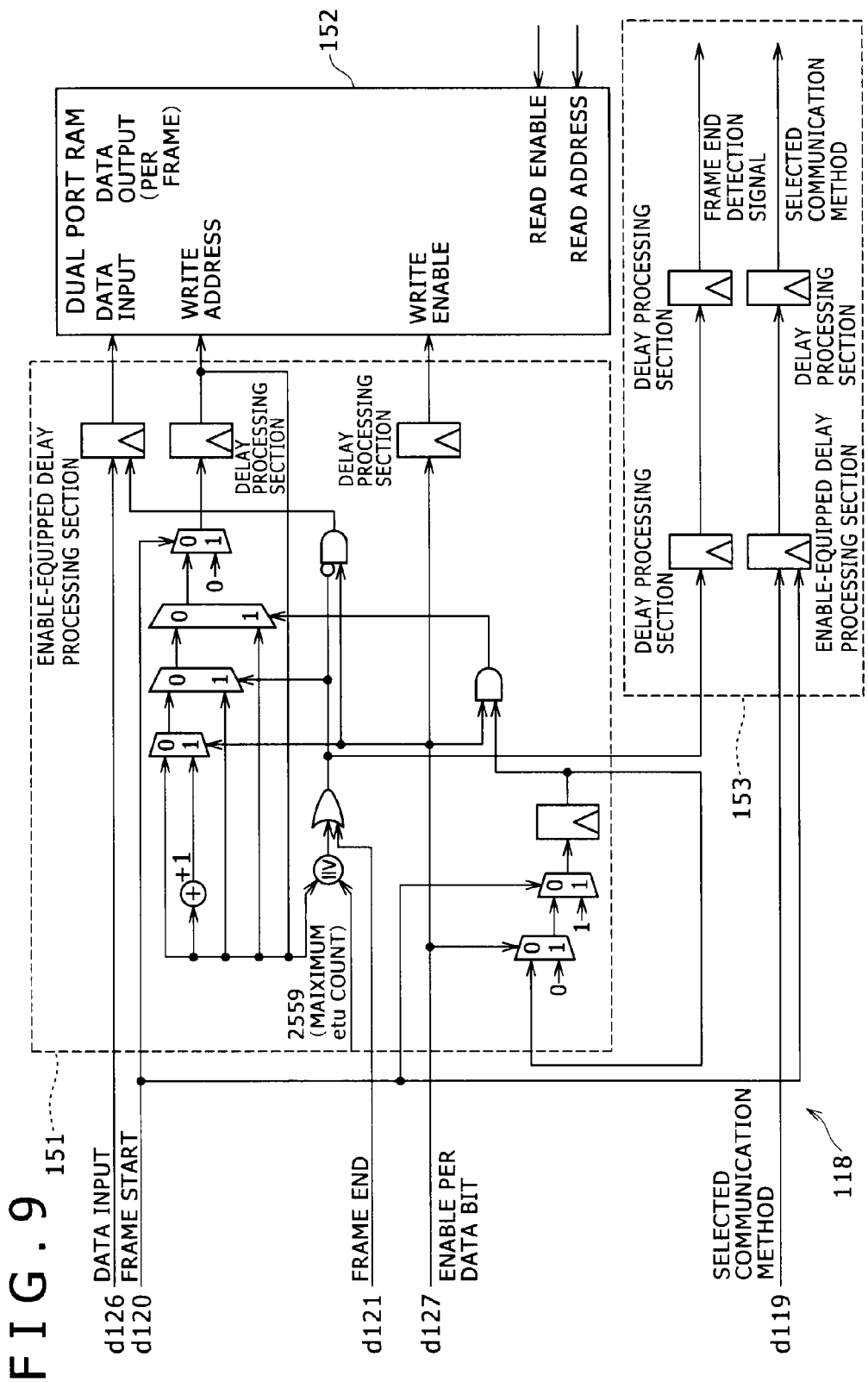
FIG. 9 is a block diagram showing a detailed composition example of a FIFO device included in FIG. 8.

FIG. 9 is a block diagram showing a detailed composition example of the FIFO device 118 included in FIG. 8. In the example of FIG. 9, the FIFO device 118 is made up of an address counting circuit 151, a dual port RAM 152, and an output delay circuit 153.

The address counting circuit 151 counts the signal d127, an enable signal per ETU, after being supplied with the frame start signal (signal d120) given as a result of the detection of a frame head corresponding to one of the communication methods. The count value acquired by the address counting circuit 151 is sent to a write address terminal of the dual port RAM 152 as a write address of the RAM 152.

A data input terminal of the dual port RAM 152 is supplied with the signal d126 as the demodulated data output from the selector 117, in a manner timed by the enable signal d127. The signal d127 is also fed to a write enable terminal of the dual port RAM 152.

That is, upon detection of a frame start representing the communication system of which a frame head has been detected, the demodulated data is written to each of addresses "0," "1," "2," etc., per ETU.

Also, the address counting circuit 151 outputs a frame end detection signal to the output delay circuit 153 when the count value accumulated from the time of the frame start has reached a predetermined ETU count, or when a frame end signal is supplied. The frame end detection signal output from the output delay circuit 153 notifies the data processing section 119 of the end of reception.

Furthermore, when supplied with a frame start signal representing a communication method different from that which corresponds to the frame head detected earlier, the address counting circuit 151 clears the count value accumulated so far and starts counting from address "0." The value counted anew by the address counting circuit 151 is then fed to the write address terminal of the dual port RAM 152.

Illustratively, if a Type B frame head is detected following the detection of a Type A frame head, then the demodulated data accumulated in the dual port RAM 152 is overwritten with newly demodulated data. In other words, the demodulated data stored in the dual port RAM 152 before the detection of the Type B frame head is discarded.

The output delay circuit 153 delays the frame end detection signal coming from the address counting circuit 151 and the signal d119 indicating the result of the determination made by the communication method selection section 115, in such a manner that the delayed signals are synchronized with the timing of a data write to the dual port RAM 152 when output to the data processing section 119.

Figure 10:
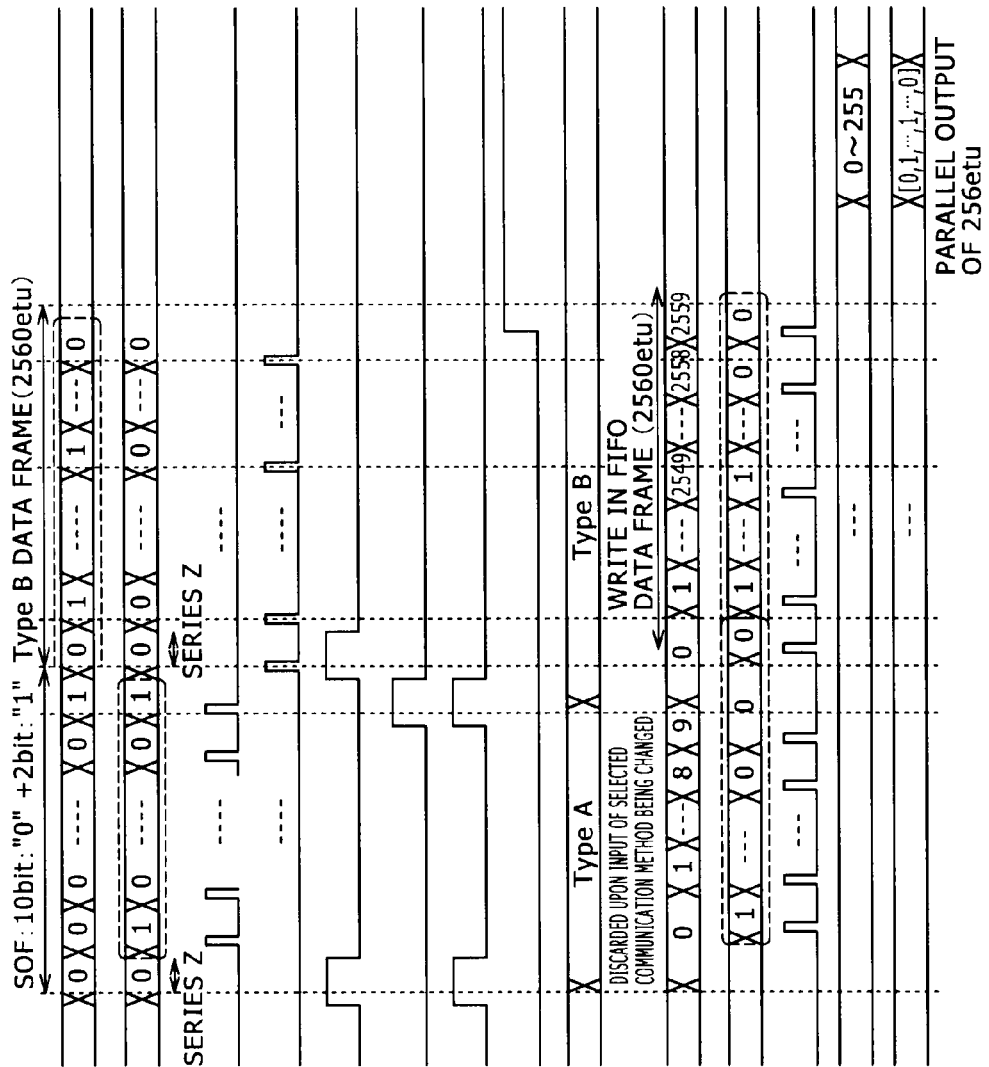
FIGS. 10A through 10N are timing charts explanatory of processing performed by the FIFO device in FIG. 9.

FIGS. 10A through 10N are timing charts explanatory of the processing performed by the FIFO device 118 when a Type B frame head is detected following the detection of a Type A frame head. In each of these figures showing waveforms of various signals, the horizontal axis stands for time and the vertical axis for signal levels.

FIG. 10A shows data values represented by the signal dill formed by the demodulated data output from the data demodulation section 134 in the Type B demodulation unit 104. In this example, data values "0," "0," "0," . . . are indicated. Arrowed lines above FIG. 10A each indicate an interval of the data values constituting the information (SOF) denoting a start of communication in the Type B format.

In FIG. 10A, the portion enclosed by broken lines corresponds to 2,560 ETU's that make up one frame of data in the Type B format.

FIG. 10B shows data values represented by the signal d112 formed by the demodulated data output from the data demodulation section 132 in the Type A demodulation unit 103. In this example, data values "0," "1," "0," . . . are indicated.

In the example of FIG. 10B, the first data value "0" is a symbol of a sequence Z. This value represents the information (SOC) denoting a start of communication in the Type A format.

FIG. 10C shows the waveform of the signal d115 that is an enable signal output from the data demodulation section 132 in the Type A demodulation unit 103.

FIG. 10D shows the waveform of the signal d116 that is an enable signal output from the data demodulation section 134 in the Type B demodulation unit 104.

FIG. 10E shows the waveform of the signal d103 output from the header detection section 131 in the Type A demodulation unit 103. As shown in FIG. 10E, the signal d103 is driven High at the same timing as the data value "0" corresponding to the symbol of each sequence Z among the data values indicated in FIG. 10B.

FIG. 10F shows the waveform of the signal d104 output from the header detection section 133 in the Type B demodulation unit 104. As shown in FIG. 10F, the signal d104 is driven High at the same timing as the data value "1" corresponding to the point in time at which the SOF is formed by the data value shown in FIG. 10A.

FIG. 10G shows the waveform of the signal d120 that is a frame start signal output from the communication method selection section 115. As shown in FIG. 10G, at the same time as the signal d103 in FIG. 10E is first driven High, the signal d120 is driven High. Furthermore, the signal d120 is also driven High at the same time as the signal d104 in FIG. 10F is first driven High. It should be noted that when the signal d103 in FIG. 10E is driven High a second time, the signal d120 is not driven High.

FIG. 10H shows the waveform of the frame end detection signal output from the FIFO device 118. As shown in FIG. 10H, the frame end detection signal is driven High ½ ETU later than the data value "0" at the point in time at which the data value shown in FIG. 10A has attained 2,560 ETU's.

FIG. 10I shows the communication methods indicated by the signal d119. As shown in FIG. 10I, the Type A communication method is indicated by the signal d119 over the period ranging from the time the frame start signal in FIG. 10G is first driven High to the time the same signal is driven High a second time. Also, the Type B communication method is indicated by the signal d119 after the frame start signal in FIG. 10G is driven High a second time.

FIG. 10J shows the write address of the dual port RAM 152. As shown in FIG. 10J, after the frame start signal in FIG. 10G is driven High, the address is counted up one by one per ETU. The minimum write address of the dual port RAM 152 is address "0." The demodulated data first supplied after the frame start signal is driven High is written to address "0" in the dual port RAM 152.

The write address of the dual port RAM 152 returns to address "0" after the frame start signal in FIG. 10G is driven High a second time. Thereafter, the write address is again counted up one by one per ETU.

FIG. 10K shows the demodulated data to be written to the dual port RAM 152. As shown in FIG. 10K, after the frame start signal in FIG. 10G is first driven High, the demodulated data indicated in FIG. 10B is written to the dual port RAM 152 one bit at a time. However, after the frame start signal in FIG. 10G is driven High a second time, the demodulated data in FIG. 10A is written one bit at a time.

It should be noted that the demodulated data to be written to the dual port RAM 152 is written thereto at a write enable timing shown in FIG. 10L.

FIG. 10M shows the read addresses of the dual port RAM 152. FIG. 10N indicates the data to be read from the FIFO device 118 into the data processing section 119. In this example, addresses 0 through 255 are designated collectively as the read addresses. In accordance with the designated addresses, 256 ETU's of data are retrieved from the FIFO device 118.

As described, if a Type B frame head is detected following the detection of a Type A frame head, what is being held in the FIFO 118 is overwritten with the demodulated data stored in the dual port RAM 152. After acquiring a frame end detection signal, the data processing section 119 reads from the FIFO device 118 the demodulated data corresponding to the currently applicable communication method (Type B format in this case) all at once.

In the manner described above, the demodulation section 100 to which the embodiments of the present invention are applied can process data appropriately. For example, even if a communication method different from the correct method is falsely detected typically due to noise upon detection of a frame head, the subsequent data processing is performed correctly.

As discussed above in reference to FIGS. 10A through 10N, if a Type B frame head is detected after the detection of a Type A frame head, what is retained in the FIFO 118 is overwritten with the demodulated data kept so far in the dual port RAM 152. However, if a Type A frame head is again detected following the detection of the Type B frame head, the content of the FIFO device 118 will not be overwritten with the demodulated data accumulated in the dual port RAM 152. That is, after the SOF in the Type B format made up of 12 ETU's of data values is detected, a new SOF in the Type A format composed of one ETU of data is ignored even if detected.

For data to be written to the FIFO device 118 as mentioned above when a Type A frame head is again detected following the detection of the Type B frame head, it is necessary suitably to control the selector 117 using the signal d119 output from the communication method selection section 115. The communication method selection section 115 determines which communication method should be selected preferentially based on the signals d122 through d125 fed from the priority criterion determination section 116 as explained earlier.

What follows is an explanation of the signals d122 through d125 supplied from the priority criterion determination section 116. FIG. 11 is a tabular view explanatory of the relations between the communication methods indicated by the signal d119 on the one hand, and the signals d122 through d125 on the other hand.

FIG. 11 shows the values indicated by the signals d122 through d125 corresponding to the Type A format, Type B format, FeliCa 424-kbps format, and FeliCa 212-kbps format, respectively. The initial values shown in FIG. 11 are the values output by the signal d119 when the communication method selection section 115 has yet to select any communication method.

FIG. 11 gives numbers 0 through 4 represented by the signals d122 through d125. Each of these numbers represents priority. The larger the number, the higher the priority represented thereby. If the priority is 0, that means the applicable communication method will not be selected by the communication method selection section 115.

If the signal d119 denotes an initial value, then values "4," "3," "2," and "1" are represented respectively by the signals d122 through d125. That is, if a frame head corresponding to one of the four communication methods is detected where the communication method selection section 115 has yet to select any communication method, the communication method selection section 115 selects the communication method according to the priorities involved.

For example, if a frame head corresponding to the Type A format is detected where the communication method selection section 115 has yet to select any communication method, the communication method selection section 115 selects the Type A format. However, if a frame head representative of the Type B format is detected at the same time as the frame head corresponding to the Type A format, the communication method selection section 115 selects the Type B format. This is because the number indicated by the signal d123 as the priority of the Type B format is 2, which is larger than the number 1 expressed by the signal d122 as the priority of the Type A format.

As described, if frame heads of different communication methods are detected simultaneously when the signal d119 denotes an initial value, the communication method with the highest priority is selected.

If the Type A format is the communication method indicated by the signal d119, then the signals d122 through d125 denote the values "4," "3," "2," and "1" respectively.

For example, if a frame head corresponding to the Type B format is detected while the Type A format is being selected by the communication method selection section 115, the communication method selection section 115 selects the Type B format. This is because the number indicated by the signal d123 as the priority of the Type B format is 2, which is larger than the number 1 expressed by the signal d122 as the priority of the Type A format.

However, if a frame head corresponding to the FeliCa format at the bit rate of 424 kbps is detected at the same time as a frame head corresponding to the Type B format, the communication method selection section 115 selects the FeliCa format at the bit rate of 424 kbps. This is because the number indicated by the signal d124 as the priority of the FeliCa format at the bit rate of 424 kbps is 3, which is larger than the number 2 expressed by the signal d123 as the priority of the Type B format.

As explained, if frame heads of different communication methods are detected simultaneously when the communication method indicated by the signal d119 is the Type A format, the communication method with the highest priority is selected.

If the Type B format is the communication method indicated by the signal d119, then the signals d122 through d125 denote the values "3," "2," "1," and "0" respectively.

For example, if a frame head corresponding to the FeliCa format at the bit rate of 424 kbps is detected while the Type B format is being selected by the communication method selection section 115, the communication method selection section 115 selects the FeliCa format at the bit rate of 424 kbps. This is because the number indicated by the signal d124 as the priority of the FeliCa format at the bit rate of 424 kbps is 2, which is larger than the number 1 expressed by the signal d123 as the priority of the Type B format.

However, if a frame head corresponding to the FeliCa format at the bit rate of 212 kbps is detected at the same time as the frame head corresponding to the FeliCa format at the bit rate of 424 kbps, the communication method selection section 115 selects the FeliCa format at the bit rate of 212 kbps. This is because the number indicated by the signal d125 as the priority of the FeliCa format at the bit rate of 212 kbps is 3, which is larger than the number 2 expressed by the signal d124 as the priority of the FeliCa format at the bit rate of 424 kbps.

As another example, if a frame head corresponding to the Type A format is detected while the Type B format is being selected by the communication method selection section 115, the communication method selection section 115 will not select the Type A format. In this case, the communication method indicated by the signal d119 remains unchanged as the Type B format. This is because the number indicated by the signal d122 as the priority of the Type A format is 0.

As explained, if a frame head representing a communication method different from the Type A format is detected at the same time when the communication method indicated by the signal d119 is the Type B format, the communication method with the highest priority is selected.

Where the communication method indicated by the signal d119 is the FeliCa format at the bit rate of 424 kbps, the signals d122 through d125 denote the values "2," "1," "0," and "0" respectively.

For example, if a frame head corresponding to the FeliCa format at the bit rate of 212 kbps is detected while the FeliCa format at the bit rate of 424 kbps is being selected by the communication method selection section 115, the communication method selection section 115 selects the FeliCa format at the bit rate of 212 kbps. This is because the number indicated by the signal d125 as the priority of the FeliCa format at the bit rate of 212 kbps is 2, which is larger than the number 1 expressed by the signal d124 as the priority of the FeliCa format at the bit rate of 424 kbps.

As another example, if a frame head corresponding to the Type A format or Type B format is detected while the FeliCa format at the bit rate of 424 kbps is being selected by the communication method selection section 115, the communication method selection section 115 will select neither the Type A format nor the Type B format. In this case, the communication method indicated by the signal d119 remains unchanged as the FeliCa format at the bit rate of 424 kbps. This is because the numbers indicated by the signal d122 as the priority of the Type A format and by the signal d123 as the priority of the Type B format are each 0.

As described, if the communication method indicated by the signal d119 is the FeliCa format at the bit rate of 424 kbps and if a frame head denoting the FeliCa format at the bit rate of 212 kbps is detected, the latter communication method is selected.

Where the communication method indicated by the signal d119 is the FeliCa format at the bit rate of 212 kbps, the signals d122 through d125 denote the values "1," "0," "0," and "0" respectively.

For example, while the FeliCa format at the bit rate of 212 kbps is being selected by the communication method selection section 115, if a frame head corresponding to some other communication format is detected, the communication method selection section 115 will not select the newly detected communication method. In this case, the communication method indicated by the signal d119 remains unchanged as the FeliCa format at the bit rate of 212 kbps. This is because the numbers indicated by the signal d122 as the priority of the Type A format, by the signal d123 as the priority of the Type B format, and by the signal d124 as the FeliCa format at the bit rate of 424 kbps are each 0.

With one of the four communication methods being selected, if a frame head corresponding to the currently selected communication method is detected, the same communication method may be selected again or the frame head may simply be ignored. This is because the communication methods involved have the priority of 1 each.

It is assumed that the information shown in FIG. 11 is stored beforehand in the form of a priority criterion table in the priority criterion determination section 116 shown in FIG. 8. The priority criterion determination section 116 takes the value of the signal d119 as an input value, and outputs the signals d122 through d125 corresponding to the input value to the communication method selection section 115.

That is, if a second communication method different from the first communication method selected earlier is selected anew, then the priorities of a plurality of (4 in this case) communication methods are all changed based on (i.e., with regard to) the second communication method.

FIG. 12 is a tabular view explanatory of how selection is made of a communication method corresponding to a frame head representative of any one of the four communication methods above when the signals d122 through d125 are output as shown in FIG. 11. In FIG. 12, F212 stands for the FeliCa format at the bit rate of 212 kbps, and F424 denotes the FeliCa format at the bit rate of 424 kbps. Also in FIG. 12, reference characters A and B represent the Type A format and Type B format, respectively.

Further in FIG. 12, each back-slashed cell indicates that the signal d119 is not updated before or after the output of the signals d122 through d125. Illustratively, if the communication method indicated by the signal d119 before update is the FeliCa method at the bit rate of 212 kbps (F212) and if the signals d105 and d106 are driven Low and High respectively, then the communication method indicated by the signal d119 is not changed to F424 (and remains unchanged as F212).

As shown in FIG. 12, if the signal d105 as a frame head detection signal corresponding to the FeliCa format at the bit rate of 212 kbps is driven High, then the FeliCa format at the bit rate of 212 kbps is selected regardless of the communication method selected by the signal d119.

With the signal d105 held Low, if the signal d106 as a frame head detection signal corresponding to the FeliCa format at the bit rate of 424 kbps is driven High and if the communication method indicated by the signal d119 is not F212, then the FeliCa format at the bit rate of 424 kbps (i.e., F424) is selected. If the communication method indicated by the signal d119 before update is F212, then the priority (of signal d124) assigned to F424 (by signal d106) in FIG. 11 is 0, which is lower than the priority of the currently selected communication method (F212). For this reason, the signal d119 remains unchanged as F212.

Also, with the signals d105 and d106 held Low, if the signal d104 as a frame head detection signal corresponding to the Type B format is driven High and if the communication method indicated by the signal d119 is neither F212 nor F424, then the Type B format is selected. If the communication method indicated by the signal d119 before update is F212 or F424, then the priority (of signal d123) assigned to the Type B format (by signal d104) in FIG. 11 is 0, which is lower than the priority of the currently selected communication method (F212 or F424). For this reason, the signal d119 remains unchanged as F212 or F424.

Furthermore, with the signals d105, d106 and d104 held Low, if the signal d103 as a frame head detection signal corresponding to the Type A format is driven High and if the communication method indicated by the signal d119 is either the Type A format or the initial value, then the Type A format is selected. If the communication method indicated by the signal d119 before update is F212, F424 or the Type B format, then the priority (of signal d122) assigned to the Type A format (by signal d103) in FIG. 11 is 0, which is lower than the priority of the currently selected communication method (F212, F424 or Type B format). For this reason, the signal d119 remains unchanged as F212, F424 or the Type B format.

As described, the communication method selection section 155 determines which of the communication methods should be selected preferentially based on the signals d122 through d125 supplied from the priority criterion determination section 116. The signal d119 denoting the selected communication method is then sent to the selector 117 and FIFO device 118.

In the examples explained above by reference to FIGS. 11 and 12, the priority of the FeliCa format at the bit rate of 212 kbps was shown set to be the highest, followed by those of the FeliCa format at the bit rate of 424 kbps, of the Type B format, and of the Type A format, in that order. In other words, the communication methods may be arranged into the following relationship in terms of priority: FeliCa format at the bit rate of 212 kbps>FeliCa format at the bit rate of 424 kbps>Type B format>Type A format.

That is, as discussed earlier in reference to FIG. 2, the frame head of the FeliCa format has a bit length longer than that of the Type B format or Type A format, and the frame head of the Type B format has a bit length longer than that of the Type A format. Upon detection of a frame head representing a communication method of a longer bit length, that result of the detection is considered to indicate the applicability of a more reliable communication method that has a higher priority established thereto.

It takes longer to detect the frame head of the FeliCa format at the bit rate of 212 kbps than the frame head of the FeliCa format at the bit rate of 424 kbps. Also, the signal in the FeliCa format at the bit rate of 212 kbps can be sampled at more sampling points than the signal in the FeliCa format at the bit rate of 424 kbps. It follows that when binarized at intervals of ¼ ETU, the binarized signal sequence is more reliable in the FeliCa format at the bit rate of 212 kbps than in the FeliCa format at the bit rate of 424 kbps. With such differences of reliability taken into account, the priority of the FeliCa format at the bit rate of 212 kbps is established to be the highest.

Figure 13:
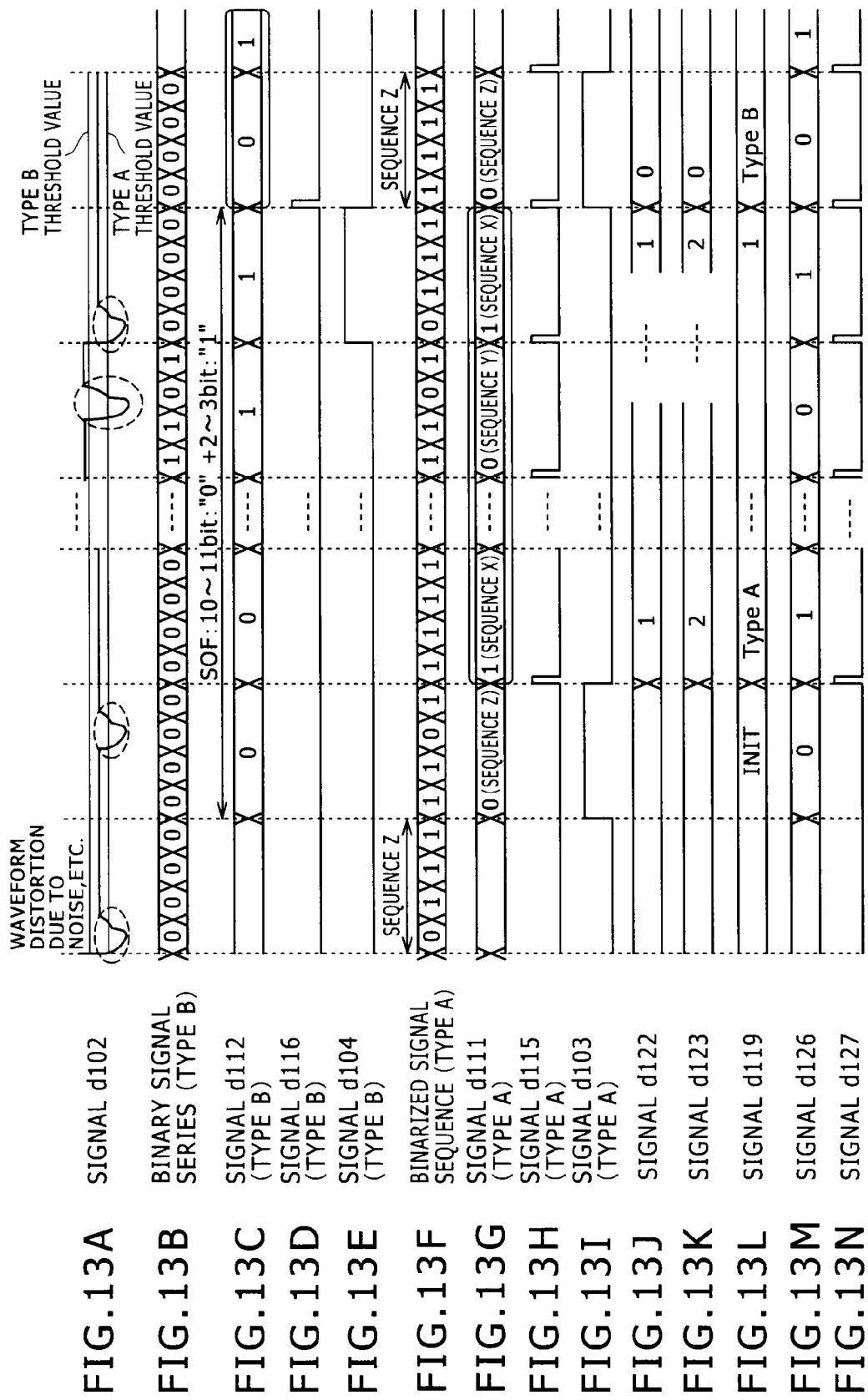
FIGS. 13A through 13N are timing charts explanatory of the operations of the demodulation section in FIG. 8.

FIGS. 13A through 13N are timing charts explanatory of the operations performed by the demodulation section 100 in FIG. 8 upon receipt of a signal in the Type B format from the reader/writer. The examples in these figures, like those in FIGS. 7A through 7J, are the waveforms of received signals being affected by noise.

FIG. 13A shows the waveform of the signal d102. FIG. 13B shows the binarized signal sequence obtained by binarizing the signal d102 using the threshold value of the Type B format at intervals of ¼ ETU. Those portions which are enclosed by ellipses in broken lines each indicate a waveform part of the signal d102 distorted due to noise.

FIG. 13C shows data values represented by the waveform of the signal d112. In this example, data values "0," "0," . . . "1," "1," "0," and "1" are indicated.

FIG. 13D shows the waveform of an enable signal output as the signal d116. In this example, an SOF is formed by the data values represented by the waveform of the signal d112 in FIG. 13C, before an enable pulse is output.

FIG. 13E shows the waveform of the signal d104. In this example, the signal d104 being driven High indicates that a frame head of the Type B format is detected. In other words, at the same time as the SOF is detected as a frame head of the Type B format, the signal d104 is driven High.

FIG. 13F shows the binarized signal sequence obtained by binarizing the signal d102 using the threshold value of the Type A format at intervals of ¼ ETU. Since the signal d102 is a detected signal acquired upon receipt of the signal in the Type B format, it is difficult intrinsically to obtain the Type A format symbols discussed above in reference to FIG. 1, from the binarized signal sequence acquired by binarizing the signal d102 at intervals of ¼ ETU using the threshold value for the Type A format.

In the case above, the waveform of the signal d102 is distorted due to noise, with the result that symbols of the sequence Z are falsely detected. This in turn causes the header detection section 131 to output a predetermined signal on the assumption that the frame head of the Type A format has been detected.

FIG. 13G shows data values represented by the waveform of the signal d111. In this case, data values "0," "1," . . . "0," "1," and "0" are output on the false assumption that the signal in the Type A format has been detected as described above.

FIG. 13H shows the waveform of an enable signal output as the signal d115. In this example, each SOC (sequence Z) is formed by the data values represented by the waveform of the signal d111 in FIG. 13G, before an enable pulse is output.

FIG. 13I shows the waveform of the signal d103. In this example, the signal d103 being driven High indicates that a frame head of the Type A format is detected. In other words, at the same time as the sequence Z is detected as a frame head of the Type A format, the signal d103 is driven High. Since the sequence Z is detected twice in this example, the signal d103 is first driven High, then Low, and again High.

FIG. 13J shows data values represented by the waveform of the signal d122 denoting the priority of the Type A format. As shown in FIG. 13J, the value "1" is output in the ETU immediately following an ETU in which the signal d103 in FIG. 13I is driven High. Also, the value "0" is output in the ETU immediately following an ETU in which the signal d104 in FIG. 13E is driven High.

FIG. 13K shows data values represented by the waveform of the signal d123 denoting the priority of the Type B format. As shown in FIG. 13K, the value "2" is output in the ETU immediately following an ETU in which the signal d103 in FIG. 13I is first driven High. Also, the value "1" is output in the ETU immediately following an ETU in which the signal d104 in FIG. 13E is driven High.

FIG. 13L shows the communication methods which are indicated by the output signal d119 and which have been selected by the communication method selection section 115. As shown in FIG. 13L, after the initial value (INIT) is output, the Type A format is indicated in the ETU immediately following an ETU in which the signal d103 in FIG. 13I is first driven High. Also, the Type B format is indicated in the ETU immediately following an ETU in which the signal d104 in FIG. 13E is driven High.

The communication method indicated by the output signal d119 will not become the Type A format in the ETU immediately following an ETU in which the signal d103 in FIG. 13I is driven High a second time. This is because, as explained above by reference to FIGS. 11 and 12, the signals d122 and d123 are used to determine the communication method to be selected.

FIG. 13M shows data values corresponding to the signal d126 output from the selector 117. As shown in FIG. 13M, as long as the communication method indicated by the output signal d119 remains the Type A format, the data values corresponding to the signal d111 in FIG. 13G are being output. Also, as long as the communication method indicated by the output signal d119 remains the Type B format, the data values corresponding to the signal d112 in FIG. 13C are being output.

FIG. 13N shows the waveform of an enable signal corresponding to the signal d127 output from the selector 117. As shown in FIG. 13N, as long as the communication method indicated by the output signal d119 remains the Type A format, the signal d115 as an enable signal in FIG. 13H is being output. Also, as long as the communication method indicated by the output signal d119 remains the Type B format, the signal d116 as an enable signal in FIG. 13D is being output.

As described above, even if a communication method different from the correct method is falsely determined typically due to noise, the subsequent data processing is performed correctly according to the present invention.

Also according to the invention, it might happen that two or more frame heads are detected during processes being carried out in parallel corresponding to a plurality of different communication methods. In such a case, the applicable communication method is selected based on the result of detection more reliable than before. Thus the time it takes to actually start exchanging information after connection is established is shortened.

Also according to the invention, the priority of each communication method to be selected is established based on the bit length of each frame head corresponding to the communication method in question and on the time required to detect that frame head. This makes it possible to carry out more reliable data processing than before.

In the examples explained above by reference to FIGS. 11 and 12, the priority of the FeliCa format at the bit rate of 212 kbps was shown set to be the highest, followed by those of the FeliCa format at the bit rate of 424 kbps, of the Type B format, and of the Type A format, in that order. However, this is not limitative of the present invention. Alternatively, the priorities of the communication methods may be established according to different criteria.

For example, as discussed earlier in reference to FIG. 1, the degree of modulation is the highest for the Type A format upon comparison among the communication methods involved. In other words, if a sequence Z in the Type A format is detected, that means a sufficiently large amplitude difference is detected from the received waveform. If the reception environment is known to be good in advance, it is difficult to interpret such a large difference in amplitude as an aberration due to noise.

Thus where the reception environment is known to be good beforehand, the priority of the Type A format may be set to be the highest, followed by those of the FeliCa format at the bit rate of 212 kbps, of the FeliCa format at the bit rate of 424 kbps, and of the Type B format, in that order.

FIGS. 14 and 15 are tabular views explanatory of what takes place when the priority of the Type A format is established to be the highest followed by those of the FeliCa format at the bit rate of 212 kbps, of the FeliCa format at the bit rate of 424 kbps, and of the Type B format, in that order.

FIG. 14 is a tabular view explanatory of the relations between the communication methods indicated by the signal d119 on the one hand, and the signals d122 through d125 on the other hand. FIG. 14 corresponds to FIG. 11 in that the meanings of the values in FIG. 14 are the same as those in FIG. 11. In the example of FIG. 14, the priority of the Type A format is set to be the highest (detailed descriptions are omitted hereunder).

FIG. 15 is a tabular view explanatory of how selection is made of a communication method corresponding to a frame head representative of any one of the above-mentioned four communication methods when the signals d122 through d125 are output. FIG. 15 corresponds to FIG. 12 in that the meanings of the values in FIG. 15 are the same as those in FIG. 12. In the example of FIG. 15, the priority of the Type A format is set to be the highest (detailed descriptions are omitted hereunder).

As explained, the priorities of the communication methods may be established in accordance with the degree of modulation of the signal to be transmitted by each of these methods.

As another alternative, the priorities may be established in a manner different from what is illustrated in FIG. 14 or 15.

Figure 16:
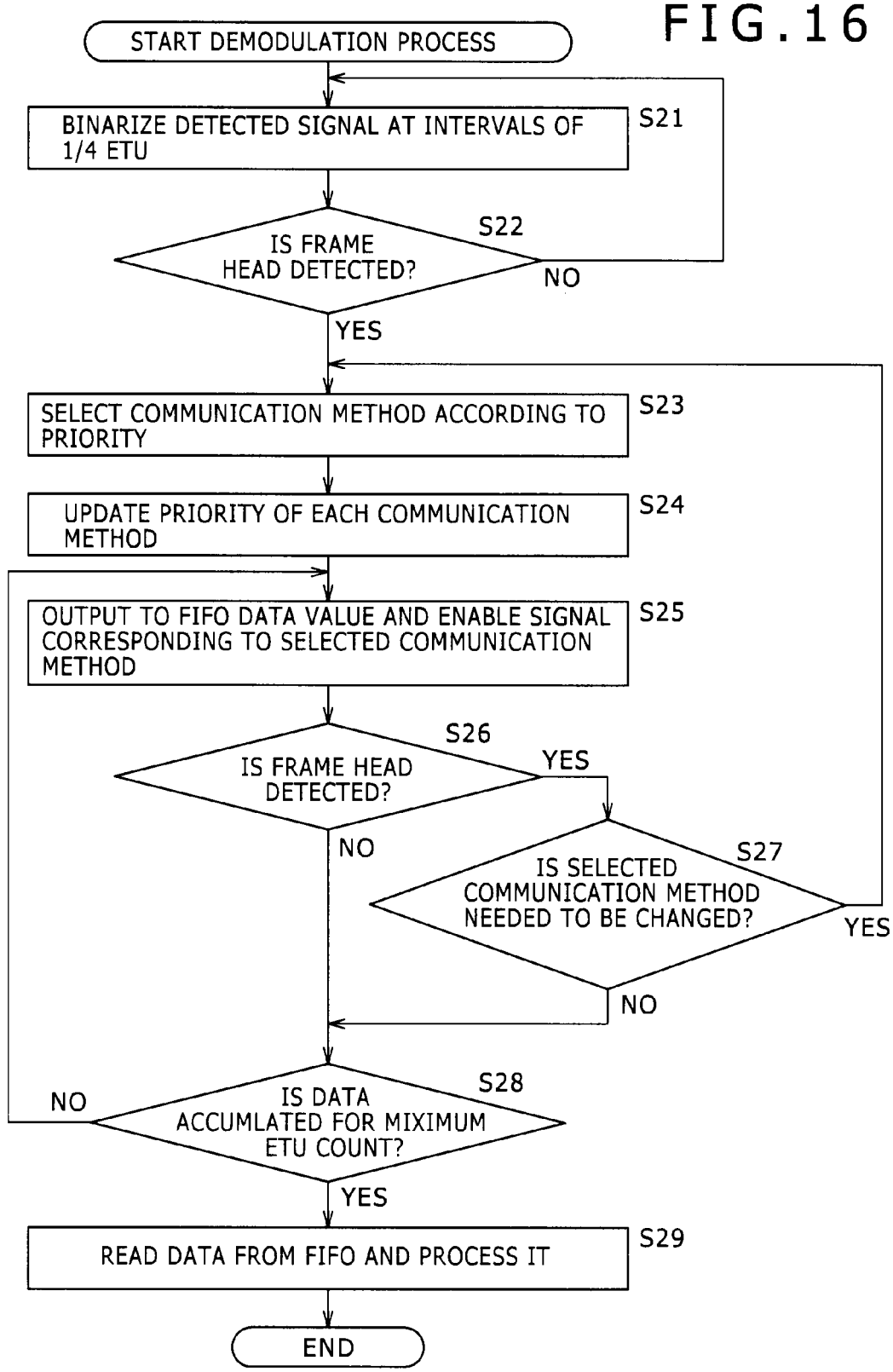
FIG. 16 is a flowchart explanatory of a typical demodulation process.

Described below by reference to the flowchart of FIG. 16 is a typical demodulation process performed by the demodulation section 100 in FIG. 8. In step S21, each of the Type A demodulation unit 103, Type B demodulation unit 104, FeliCa 424-kbps demodulation unit 106, and FeliCa 212-kbps demodulation unit 105 binarizes the detected signal (signal d102) at intervals of ¼ ETU.

In step S22, the communication method selection section 115 checks to determine whether a frame head corresponding any one of the Type A format, Type B format, FeliCa format at the bit rate of 424 kbps, and FeliCa format at the bit rate of 212 kbps is detected. The check is made on the basis of the signals d103 through d106.

If in step S22 a frame head corresponding to one of the communication methods is found detected, control is passed on to step S23. If no such frame head is found detected in step S22, control is returned to step S21.

In step S23, the communication method selection section 115 selects the communication method based on priorities. At this point, the communication method is selected on the basis of the priorities discussed above by reference to FIG. 12. The signal d119 representing the selected communication method is then output.

In step S24, the priority criterion determination section 116 updates (i.e., changes) the priorities of the communication methods based on the result of the selection made in step S23. At this point, the priorities of the communication methods are changed as discussed above by reference to FIG. 11. Also changed are the values output by the signals d122 through d125 representing the priorities of the communication methods.

In step S25, the selector 117 outputs to the FIFO device 118 the data value (signal d126) corresponding to the communication method selected in step S23, along with an enable signal (signal d127).

In step S26, the communication method selection section 115 checks to determine whether a frame head corresponding to any one of the Type A format, Type B format, FeliCa format at the bit rate of 424 kbps, and FeliCa format at the bit rate of 212 kbps is detected. The check is made on the basis of the signals d103 through d106.

If in step S26 a frame head corresponding to one of the communication methods is found detected, control is passed on to step S27.

In step S27, the communication method selection section 115 checks to determine whether it is necessary to change the selected communication method. If in step S27 it is found necessary to change the selected communication method, control is returned to step S23. If it is found unnecessary to change the selected communication method in step S27, then control is passed on to step S28. That is, a check is made to determine whether it is necessary to change the communication method indicated by the signal d119. The communication method is changed when necessary in the manner discussed above by reference to FIG. 12.

If in step S26 no frame head is found detected, then step S27 is skipped.

In step S28, the data processing section 119 checks to determine whether the data corresponding to the maximum ETU count has been accumulated in the FIFO device 118. If the data is not found to have accumulated yet over the maximum ETU count, control is returned to step S25.

If in step S28 the data corresponding to the maximum ETU count is found accumulated, then control is passed on to step S29.

In step S29, the data processing section 119 reads the accumulated data from the FIFO device 118 and processes the retrieved data. This step concludes the demodulation process carried out as described above.

Figure 17:
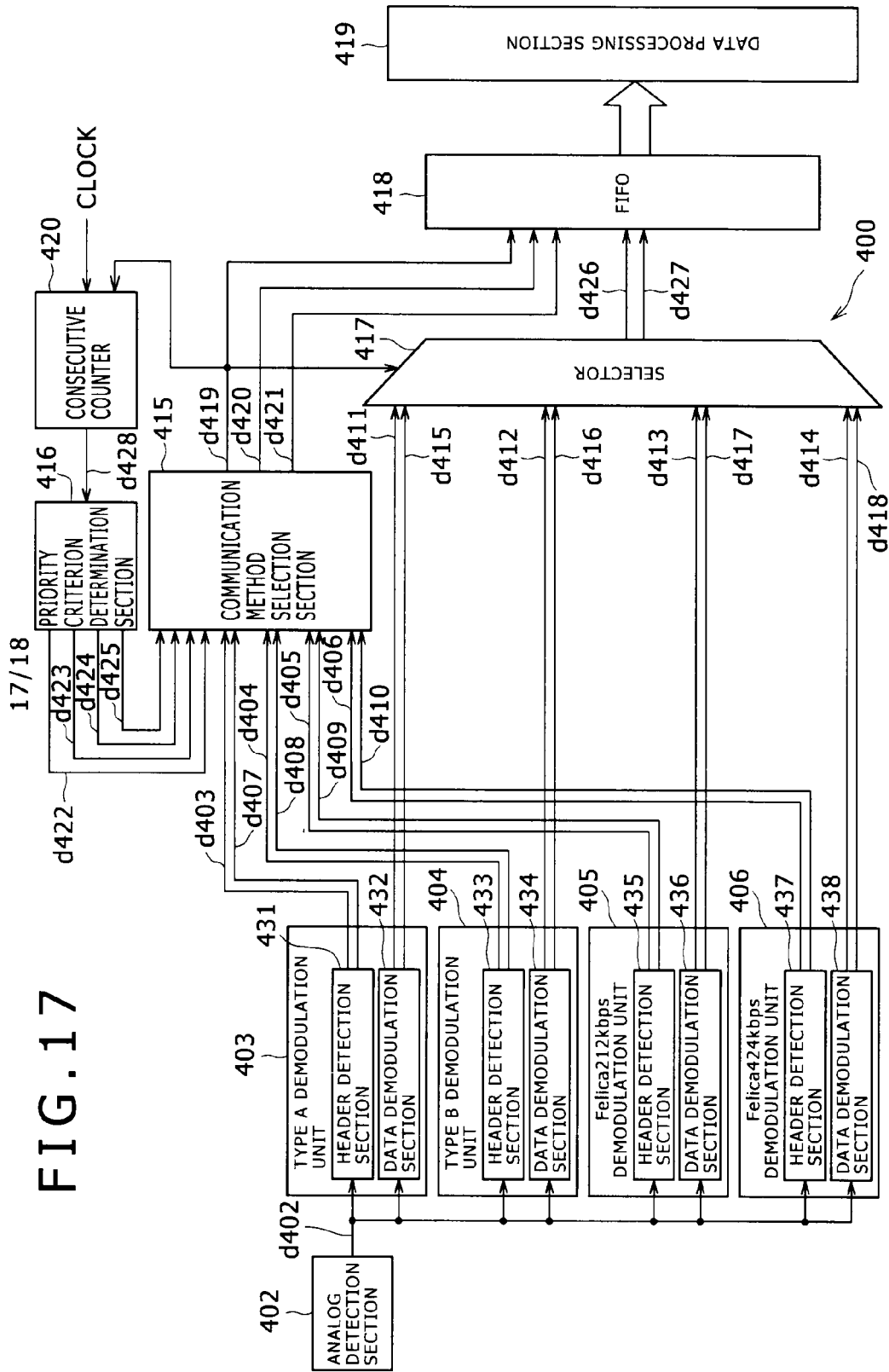
FIG. 17 is a block diagram showing another composition example of the demodulation section as part of the embodiment of the invention.

FIG. 17 is a block diagram showing another composition example of the demodulation section as part of the embodiment of the invention. In FIG. 17, the function blocks ranging from an analog detection section 402 to a data processing section 419 are equivalent to those ranging from the analog detection section 102 to the data processing section 119 in FIG. 8. Also, signals d402 through d427 output from these blocks are equivalent to the signals d102 through d127 in FIG. 8, so that their detailed descriptions will be omitted hereunder where redundant.

Unlike the demodulation section 100 in FIG. 8, the demodulation section 400 in FIG. 17 includes a consecutive counter 420 in its structure. Based on the signal d419, the consecutive counter 420 identifies the communication method selected by the communication method selection section 415. As long as a given communication method is being continuously selected, the consecutive counter 420 keeps counting the clock.

For example, where the communication method indicated by the signal d419 is the Type A format, the consecutive counter 420 counts up an internal clock of the demodulation section 400, until the currently selected communication method is replaced by another communication method.

The consecutive counter 420 may alternatively count up the enable signal that is output along with the demodulated data.

When the accumulated clock count on the consecutive counter 420 has exceeded a predetermined threshold value, the consecutive counter 420 outputs a signal d428 for changing the reference criterion table inside the priority criterion determination section 416.

For example, consider the case where the communication method indicated by the signal d419 is the Type B format and where the cumulative clock count on the consecutive counter 420 has exceeded the predetermined threshold value. It is assumed here that the priority criterion table reflecting the priorities discussed above by reference to FIG. 11 is stored in the priority criterion determination section 416.

In the case above, the priority criterion table held in the priority criterion determination section 416 is changed to what is shown in FIG. 18. FIG. 18 is a tabular view explanatory of the relations between the communication methods indicated by the signal d419 on the one hand, and the signals d422 through d425 on the other hand. FIG. 18 corresponds to FIG. 11 in that the meanings of the values in FIG. 18 are the same as those in FIG. 11. In the table of FIG. 18, the row "Type B" under the heading "Values of d419" shows that some priorities are changed based on the signal d428. More specifically, the number on the left of each arrow is changed to the number on the right of the arrow in question.

In the example of FIG. 18, where the communication method selected by the communication method selection section 415 is the Type B format, the values represented by the signals d422 through d425 are changed to "0," "0," "1," and "0" respectively. That is, while the communication method selected by the communication method selection section 415 is the Type B format, the communication method remains unchanged even if a frame head corresponding to another communication method is detected.

With the Type B format selected by the communication method selection section 415 and upon elapse of a sufficiently long time period, a frame head corresponding to another communication method might be detected. However, such detection is highly likely to be erroneous, typically due to noise. Such an eventuality may be circumvented by changing the priority criterion table as shown in FIG. 18.

As described, where a given communication method has been selected for a sufficiently long time period, arrangements can be made intentionally to avert the selection of a new communication method even if a frame head of some other communication method is detected.

FIG. 18 gives only one example of the changed priority criterion table. The way the priorities are to be changed may be determined differently in accordance with past experiences, projected purposes, etc.

Regarding the example of FIG. 18, it is assumed that the priority criterion table is changed automatically. Alternatively, the priority criterion table may be altered illustratively by the user manually inputting changed settings.

It is assumed that the demodulation section 100 in FIG. 8 and the demodulation section 400 in FIG. 17 each contain unit demodulation sections corresponding to the Type A format, Type B format, FeliCa format at the bit rate of 424 kbps, and FeliCa format at the bit rate of 212 kbps. In the future, however, a communication method or methods for use between the noncontact IC card and the reader/writer might be added anew or discarded. For any newly added communication method, a corresponding unit demodulation section can be installed anew in the demodulation section 100 in FIG. 8 and in the demodulation section 400 in FIG. 17.

In this specification, the series of the above-described processes includes not only the processes that are to be carried out in the depicted sequence (i.e., on a time series basis) but also processes that may be performed parallelly or individually and not necessarily chronologically.

It should be understood that the present invention when embodied is not limited to the above-described embodiments and that various modifications, variations and alternatives may be made of the invention so far as they are within the scope of the appended claims or the equivalents thereof.

The present application contains subject matter related to that disclosed in Japanese Priority Patent Application JP 2009-285036 filed in the Japan Patent Office on Dec. 16, 2009, the entire content of which is hereby incorporated by reference.

What is claimed is:

1. A signal processing apparatus comprising:
   one or more processing circuits configured to:
   determine whether a frame head complying with one of a plurality of communication methods is detected by comparing a waveform of a signal received from an external apparatus with a plurality of predetermined different symbol patterns;
   select said one of said plurality of communication methods for communicating with said external apparatus based on said determination and on a priority of each of said plurality of communication methods;

alter the priority of each of said plurality of communication methods based on a selected second communication method when the second communication method, different from an initially selected first communication method, is selected anew;

generate a binarized signal sequence, based on binarizing a detected signal obtained by detecting the signal received from said external apparatus, at a predetermined sampling rate and at a predetermined threshold value; and demodulate the signal received from said external apparatus into demodulated data using demodulation methods corresponding to said plurality of communication methods while generating enable signals corresponding to said demodulated data, wherein each of a plurality of symbols obtained from said binarized signal sequence is compared with said plurality of predetermined different symbol patterns.

2. The signal processing apparatus according to claim 1, wherein said priority of each of said plurality of communication methods is determined based on a number of symbols in said frame head complying with each of said plurality of communication methods.

3. The signal processing apparatus according to claim 1, wherein said priority of each of said plurality of communication methods is determined based on a number of sample points in said frame head complying with each of said plurality of communication methods.

4. The signal processing apparatus according to claim 1, wherein said one or more processing circuits are configured to store in a priority criterion table, the priority of each of said plurality of communication methods based on a communication method selected.

5. The signal processing apparatus according to claim 4, wherein said one or more processing circuits are configured to:
   count a demodulation time corresponding to a communication method being selected; and
   alter said priority criterion table if the demodulation time exceeds a predetermined threshold value.

6. The signal processing apparatus according to claim 1, wherein said one or more processing circuits are configured to:

selectively output demodulated data and an enable signal corresponding to a communication method selected; and write said demodulated data output to a storage area of a predetermined address based on said enable signal.

7. The signal processing apparatus according to claim 6, wherein said one or more processing circuits are configured to over write said storage area of said predetermined address where demodulated data corresponding to said first communication method is stored, with demodulated data and which corresponds to said second communication method, if said first communication method selected is superseded by said second communication method selected anew.

8. A signal processing method, the method comprising:
   determining, by one or more processing circuits, whether a frame head complying with one of a plurality of communication methods is detected by comparing a waveform of a signal received from an external apparatus with a plurality of predetermined different symbol patterns;

selecting said one of said plurality of communication methods for communicating with said external apparatus based on said determination and on a priority of each of said plurality of communication methods;

altering the priority of each of said plurality of communication methods based on a selected second communication method when the second communication method, different from an initially selected first communication method, is selected anew generating a binarized signal sequence by binarizinq a detected signal obtained by detecting the signal received from said external apparatus, at a predetermined sampling rate and at a predetermined threshold value; and demodulating the signal received from said external apparatus into demodulated data using demodulation methods corresponding to said plurality of communication methods while generating enable signals corresponding to said demodulated data, wherein each of a plurality of symbols obtained from said binarized signal sequence is compared with said plurality of predetermined different symbol patterns.

* * * * *